United States Patent
Seay

(10) Patent No.: US 11,807,480 B2
(45) Date of Patent: Nov. 7, 2023

(54) REEL EDITOR FOR PRE-PRINT PAPER, SHEET, AND BOX MANUFACTURING SYSTEMS

(71) Applicant: Georgia-Pacific Corrugated LLC, Atlanta, GA (US)

(72) Inventor: Robert Dennis Seay, San Diego, CA (US)

(73) Assignee: Georgia-Pacific Corrugated LLC, Atlanta, GA (US)

( * ) Notice: Subject to any disclaimer, the term of this patent is extended or adjusted under 35 U.S.C. 154(b) by 47 days.

(21) Appl. No.: 17/696,969

(22) Filed: Mar. 17, 2022

(65) Prior Publication Data
US 2022/0204298 A1 Jun. 30, 2022

Related U.S. Application Data

(63) Continuation of application No. 16/033,350, filed on Jul. 12, 2018, now abandoned.
(Continued)

(51) Int. Cl.
*B65H 23/18* (2006.01)
*G06Q 10/06* (2023.01)
(Continued)

(52) U.S. Cl.
CPC .......... *B65H 23/1806* (2013.01); *B26D 7/27* (2013.01); *D21F 7/02* (2013.01); *D21G 9/0036* (2013.01);
(Continued)

(58) Field of Classification Search
CPC ............ B65H 23/1806; B65H 2220/02; B65H 2301/41702; B65H 2301/543;
(Continued)

(56) References Cited

U.S. PATENT DOCUMENTS 2,318,937 A 5/1943 Goldney et al.
3,058,869 A 10/1962 Cohen
(Continued)

FOREIGN PATENT DOCUMENTS

CA 1215568 A 12/1986
CA 2152003 A1 12/1995
(Continued)

OTHER PUBLICATIONS

BHS Corrugator 4.0 Presentation (ICCA, Apr. 2015) 13 pages.
(Continued)

*Primary Examiner* — Christopher E. Everett
*Assistant Examiner* — Olvin Lopez Alvarez

(57) ABSTRACT

Systems for providing efficient manufacturing of paper, sheet, and/or box products of varying size and structure, often with pre-applied print ("pre-print"), are provided herein. Efficient customer ordering/tracking, job aggregation, print imposition, corrugator planning, and tracking and adjustments throughout the manufacturing process are contemplated. A reel editor is configured to edit the roll based on waste and/or errors that occurred during various manufacturing processes (e.g., during printing). A control plan defining what is on each roll of printed web product may be updated after editing. Depending on the configuration, the reel editor may be integrated with various manufacturing components. The reel editor may be configured to determine if there is enough waste on the roll to even making editing worthwhile, such as based on desired quality of the images, customer requirements, different price points, among other possible factors.

20 Claims, 21 Drawing Sheets

Related U.S. Application Data

(60) Provisional application No. 62/597,016, filed on Dec. 11, 2017, provisional application No. 62/583,857, filed on Nov. 9, 2017, provisional application No. 62/532,483, filed on Jul. 14, 2017.

(51) Int. Cl.
*G06Q 10/04* (2023.01)
*D21G 9/00* (2006.01)
*D21F 7/02* (2006.01)
*G06Q 10/0631* (2023.01)
*B26D 7/27* (2006.01)
*D21F 11/12* (2006.01)

(52) U.S. Cl.
CPC ......... *D21G 9/0045* (2013.01); *G06Q 10/043* (2013.01); *G06Q 10/0631* (2013.01); *B65H 2220/02* (2013.01); *B65H 2301/41702* (2013.01); *B65H 2301/543* (2013.01); *B65H 2701/1242* (2013.01); *B65H 2701/1762* (2013.01); *B65H 2701/53* (2013.01); *B65H 2801/21* (2013.01); *B65H 2801/31* (2013.01); *D21F 11/12* (2013.01)

(58) Field of Classification Search
CPC .... B65H 2701/1242; B65H 2701/1762; B65H 2701/53; B65H 2801/21; B65H 2801/31; B26D 7/27; B26D 5/007; D21F 7/02; D21F 11/12; D21G 9/0036; D21G 9/0045; G06Q 10/043; G06Q 10/0631; G06T 2207/10024; G06T 2207/30204; G06T 2207/30124; G06T 7/0004; B31F 1/20; B31F 1/2831; G01N 21/89
See application file for complete search history.

(56) References Cited

U.S. PATENT DOCUMENTS

| | | |
|---|---|---|
| 3,667,252 A | 6/1972 | Nelson |
| 3,667,353 A | 6/1972 | Ward, Jr. et al. |
| 3,667,354 A | 6/1972 | Steinmetz |
| 4,086,120 A | 4/1978 | Cosby et al. |
| 4,287,797 A | 9/1981 | Seragnoli |
| 4,387,614 A | 6/1983 | Evans |
| 4,415,978 A | 11/1983 | Craemer et al. |
| 4,545,780 A | 10/1985 | Martin |
| 4,576,663 A | 3/1986 | Bory |
| 4,604,083 A | 8/1986 | Barny et al. |
| 4,737,904 A | 4/1988 | Ominato |
| 4,847,775 A | 7/1989 | Roch et al. |
| 5,117,610 A | 6/1992 | Hartman et al. |
| 5,325,306 A | 6/1994 | Adachi et al. |
| 5,458,062 A | 10/1995 | Goldberg et al. |
| 5,705,020 A | 1/1998 | Chiari |
| 5,727,748 A | 3/1998 | Prittie |
| 5,802,974 A | 9/1998 | McNeil |
| 5,816,994 A | 10/1998 | Hill et al. |
| 5,822,208 A | 10/1998 | Bory |
| 5,899,128 A | 5/1999 | Smithe et al. |
| 5,918,519 A | 7/1999 | Schnabel et al. |
| 5,926,825 A | 7/1999 | Shirakawa |
| 6,070,396 A | 6/2000 | Rinaldi et al. |
| 6,112,658 A | 9/2000 | Gunther et al. |
| 6,125,374 A | 9/2000 | Terry et al. |
| 6,149,565 A | 11/2000 | Meyer et al. |
| 6,170,881 B1 | 1/2001 | Salmon et al. |
| 6,188,490 B1 | 2/2001 | Miyake |
| 6,207,242 B1 | 3/2001 | Hoffman |
| 6,234,943 B1 | 5/2001 | Copin |
| 6,299,730 B1 | 10/2001 | Broek et al. |
| 6,352,497 B1 | 3/2002 | Hensley et al. |
| 6,378,862 B1 | 4/2002 | Rebeaud |
| 6,450,381 B1 | 9/2002 | Ernst et al. |
| 6,473,760 B1 | 10/2002 | Klatt et al. |
| 6,481,709 B2 | 11/2002 | Gombau et al. |
| 6,496,219 B1 | 12/2002 | Porret et al. |
| 6,499,397 B2 | 12/2002 | Stern |
| 6,606,947 B2 | 8/2003 | Frossard et al. |
| 6,650,433 B1 | 11/2003 | Keane et al. |
| 6,725,123 B1 | 4/2004 | Denuell |
| 6,771,384 B1 | 8/2004 | Laverty et al. |
| 6,791,707 B2 | 9/2004 | Laverty et al. |
| 6,821,038 B2 | 11/2004 | Izawa |
| 6,893,520 B2 | 5/2005 | Cummings et al. |
| 6,934,046 B1 | 8/2005 | Nishikawa et al. |
| 6,976,798 B2 | 12/2005 | Keane et al. |
| 6,992,794 B2 | 1/2006 | Keane et al. |
| 7,009,723 B1 | 3/2006 | Bartholet et al. |
| 7,073,444 B2 | 7/2006 | Alonso et al. |
| 7,093,540 B2 | 8/2006 | Giancaterino et al. |
| 7,114,444 B2 | 10/2006 | Hutchinson et al. |
| 7,133,149 B2 | 11/2006 | Keane et al. |
| 7,145,670 B2 | 12/2006 | Keane et al. |
| 7,154,627 B2 | 12/2006 | Nishikawa et al. |
| 7,182,007 B2 | 2/2007 | Berge et al. |
| 7,187,465 B2 | 3/2007 | Keane et al. |
| 7,187,472 B2 | 3/2007 | Friedman et al. |
| 7,187,995 B2 | 3/2007 | Floeder et al. |
| 7,242,463 B2 | 7/2007 | Pilloud et al. |
| 7,297,969 B1 | 11/2007 | Wolinsky et al. |
| 7,307,749 B2 | 12/2007 | Nishikawa et al. |
| 7,398,733 B2 | 7/2008 | De Vries et al. |
| 7,469,872 B2 | 12/2008 | Compagnone et al. |
| 7,495,796 B2 | 2/2009 | Keane et al. |
| 7,542,155 B2 | 6/2009 | Paskalev et al. |
| 7,726,899 B2 | 6/2010 | Clement |
| 7,832,441 B2 | 11/2010 | Titz |
| 7,855,799 B2 | 12/2010 | Shah |
| 7,871,479 B2 | 1/2011 | Garland |
| 7,949,566 B2 | 5/2011 | Fogelson |
| 8,009,308 B2 | 8/2011 | Field |
| 8,030,013 B2 | 10/2011 | Llovet et al. |
| 8,045,147 B2 | 10/2011 | Toma et al. |
| 8,059,290 B2 | 11/2011 | Kuroshima |
| 8,060,234 B2 | 11/2011 | Hellstrom et al. |
| 8,175,739 B2 | 5/2012 | Floeder et al. |
| 8,241,454 B2 | 8/2012 | Kraus et al. |
| 8,270,007 B2 | 9/2012 | Pandit et al. |
| 8,310,696 B2 | 11/2012 | Gustafson et al. |
| 8,390,872 B2 | 3/2013 | Abe et al. |
| 8,418,614 B2 | 4/2013 | Whitelaw et al. |
| 8,464,638 B2 | 6/2013 | Whitelaw et al. |
| 8,482,766 B2 | 7/2013 | Greene et al. |
| 8,488,144 B2 | 7/2013 | Fujimori et al. |
| 8,520,254 B2 | 8/2013 | Rai |
| 8,531,721 B2 | 9/2013 | Minagawa |
| 8,534,194 B2 | 9/2013 | Whitelaw et al. |
| 8,630,013 B2 | 1/2014 | Minagawa |
| 8,634,089 B2 | 1/2014 | Keane et al. |
| 8,634,731 B2 | 1/2014 | Has et al. |
| 8,732,003 B2 | 5/2014 | Keane et al. |
| 8,733,222 B2 | 5/2014 | Borel et al. |
| 8,757,479 B2 | 6/2014 | Clark et al. |
| 8,783,144 B2 | 7/2014 | Compagnone et al. |
| 8,817,324 B2 | 8/2014 | Giannetti et al. |
| 8,834,334 B2 | 9/2014 | Palm et al. |
| 8,842,313 B2 | 9/2014 | Harrington |
| 8,887,637 B2 | 11/2014 | Huber et al. |
| 8,891,126 B2 | 11/2014 | Tufano |
| 8,931,410 B2 | 1/2015 | Noy |
| 9,056,515 B2 | 6/2015 | Wingkono et al. |
| 9,073,720 B2 | 7/2015 | Beguin et al. |
| 9,108,382 B2 | 8/2015 | Gnan et al. |
| 9,132,599 B2 | 9/2015 | Bober |
| 9,152,362 B2 | 10/2015 | Keane et al. |
| 9,278,555 B2 | 3/2016 | Toriihara et al. |
| 9,298,404 B2 | 3/2016 | Niblett, Jr. |
| 9,298,706 B2 | 3/2016 | Magnell |
| 9,325,860 B2 | 4/2016 | Lachajewski et al. |
| 9,327,421 B2 | 5/2016 | Beguin |
| 9,327,485 B2 | 5/2016 | Mann et al. |

(56) References Cited

U.S. PATENT DOCUMENTS

| | | | |
|---|---|---|---|
| 9,340,007 B2 | 5/2016 | D'Annunzio et al. |
| 9,361,550 B2 | 6/2016 | Barros et al. |
| 9,481,537 B2 | 11/2016 | Beguin et al. |
| 9,518,362 B2 | 12/2016 | Bomstad et al. |
| 9,539,828 B2 | 1/2017 | Yasinover et al. |
| 9,645,774 B2 | 5/2017 | Keane et al. |
| 9,663,261 B2 | 5/2017 | Azad et al. |
| 9,898,232 B2 | 2/2018 | Has et al. |
| 9,904,494 B2 | 2/2018 | Ujike |
| 10,576,650 B2 | 3/2020 | Bayer et al. |
| 2002/0014577 A1 | 2/2002 | Ulrich et al. |
| 2002/0062751 A1 | 5/2002 | Bardet et al. |
| 2002/0078847 A1 | 6/2002 | Bardet et al. |
| 2002/0083857 A1 | 7/2002 | Bardet et al. |
| 2002/0197091 A1 | 12/2002 | Otsuki |
| 2003/0149747 A1 | 8/2003 | Rai et al. |
| 2004/0041991 A1 | 3/2004 | Obertegger |
| 2004/0042022 A1 | 3/2004 | Friedman et al. |
| 2004/0150856 A1 | 8/2004 | Asai |
| 2004/0182503 A1 | 9/2004 | Stadele |
| 2004/0182504 A1 | 9/2004 | Stadele et al. |
| 2004/0211330 A1 | 10/2004 | Clark et al. |
| 2004/0211510 A1 | 10/2004 | Franko |
| 2005/0000084 A1 | 1/2005 | Barbet et al. |
| 2005/0000842 A1 | 1/2005 | Timmerman et al. |
| 2005/0044550 A1 | 2/2005 | Perdu |
| 2005/0085362 A1 | 4/2005 | Hutchinson et al. |
| 2005/0141760 A1 | 6/2005 | Floeder et al. |
| 2005/0209075 A1 | 9/2005 | Kocherga et al. |
| 2005/0247173 A1 | 11/2005 | Alsten et al. |
| 2006/0027303 A1 | 2/2006 | Hunter |
| 2006/0090319 A1 | 5/2006 | Howe |
| 2006/0148631 A1 | 7/2006 | Protocsnak et al. |
| 2006/0222429 A1 | 10/2006 | Kurashina |
| 2006/0257014 A1 | 11/2006 | Oi |
| 2007/0120357 A1 | 5/2007 | Kapadi et al. |
| 2007/0162326 A1 | 7/2007 | Weel et al. |
| 2007/0175350 A1 | 8/2007 | Crum |
| 2007/0289460 A1 | 12/2007 | Tang |
| 2008/0075488 A1 | 3/2008 | Moriyama et al. |
| 2008/0239381 A1 | 10/2008 | Oshima |
| 2008/0273224 A1 | 11/2008 | Maulsby et al. |
| 2008/0308215 A1 | 12/2008 | Kraus et al. |
| 2008/0308251 A1 | 12/2008 | Weyer et al. |
| 2009/0021838 A1 | 1/2009 | Raymond et al. |
| 2009/0025002 A1 | 1/2009 | Rai |
| 2009/0080022 A1 | 3/2009 | Tsutsumi |
| 2009/0120563 A1 | 5/2009 | Titz |
| 2009/0217835 A1 | 9/2009 | Rozenblum |
| 2009/0218380 A1 | 9/2009 | Prittie |
| 2009/0243204 A1 | 10/2009 | Breunig et al. |
| 2009/0262159 A1 | 10/2009 | Lang |
| 2011/0122212 A1 | 5/2011 | Pettersson et al. |
| 2011/0149337 A1 | 6/2011 | Goetz et al. |
| 2012/0019866 A1 | 1/2012 | Kuroshima |
| 2012/0053039 A1 | 3/2012 | Compagnone et al. |
| 2012/0148326 A1 | 6/2012 | Ipponyari et al. |
| 2012/0250047 A1 | 10/2012 | Prati |
| 2013/0029825 A1 | 1/2013 | Rich |
| 2013/0094033 A1 | 4/2013 | Giannetti et al. |
| 2013/0139959 A1 | 6/2013 | Wang |
| 2013/0141763 A1 | 6/2013 | Giannetti et al. |
| 2013/0184133 A1 | 7/2013 | Sugimoto et al. |
| 2013/0184134 A1 | 7/2013 | Suzuki et al. |
| 2013/0203579 A1 | 8/2013 | Vermunt |
| 2013/0209750 A1 | 8/2013 | Van Berlo |
| 2013/0286410 A1 | 10/2013 | Yasinover et al. |
| 2014/0000785 A1 | 1/2014 | Gnan et al. |
| 2014/0067104 A1 | 3/2014 | Osterhout |
| 2014/0162862 A1 | 6/2014 | Shimura et al. |
| 2014/0182470 A1 | 7/2014 | Clarke et al. |
| 2014/0251170 A1 | 9/2014 | Chiari et al. |
| 2014/0274643 A1 | 9/2014 | Clark et al. |
| 2014/0293297 A1 | 10/2014 | Nagahara |
| 2014/0297357 A1 | 10/2014 | Zeng et al. |
| 2014/0376043 A1 | 12/2014 | Tsujita |
| 2015/0022845 A1 | 1/2015 | Roscoe et al. |
| 2015/0090140 A1 | 4/2015 | Rancourt et al. |
| 2015/0101740 A1 | 4/2015 | Morales Garcia de la Vega et al. |
| 2015/0115976 A1 | 4/2015 | Adams et al. |
| 2015/0221077 A1 | 8/2015 | Kawabata et al. |
| 2015/0291382 A1 | 10/2015 | Moh |
| 2015/0292155 A1 | 10/2015 | Bomstad et al. |
| 2016/0004249 A1 | 1/2016 | Cummings et al. |
| 2016/0008998 A1 | 1/2016 | Denisse et al. |
| 2016/0016324 A1 | 1/2016 | Bapst et al. |
| 2016/0121572 A1 | 5/2016 | Giancaterino |
| 2016/0231966 A1 | 8/2016 | Ujike |
| 2016/0286064 A1 | 9/2016 | Numao et al. |
| 2016/0306595 A1 | 10/2016 | Has et al. |
| 2016/0318297 A1 | 11/2016 | Whitelaw et al. |
| 2016/0361886 A1 | 12/2016 | Suzuki et al. |
| 2017/0043570 A1 | 2/2017 | Bastici et al. |
| 2017/0057771 A1 | 3/2017 | Clement |
| 2017/0087793 A1 | 3/2017 | Mark et al. |
| 2017/0087794 A1 | 3/2017 | Bayer et al. |
| 2017/0087879 A1 | 3/2017 | Mark |
| 2017/0180598 A1 | 6/2017 | Nagahara |
| 2017/0308335 A1 | 10/2017 | Keane et al. |
| 2017/0344316 A1 | 11/2017 | Keane et al. |
| 2018/0000842 A1 | 1/2018 | Dhuppad et al. |
| 2018/0009616 A1 | 1/2018 | Kodama et al. |
| 2018/0037037 A1 | 2/2018 | Takagi et al. |
| 2018/0200906 A1 | 7/2018 | Senoo |
| 2018/0215061 A1 | 8/2018 | Bayer et al. |
| 2018/0250971 A1 | 9/2018 | Singla et al. |
| 2018/0253263 A1 | 9/2018 | Hower et al. |
| 2018/0345619 A1 | 12/2018 | Lang et al. |
| 2019/0016081 A1 | 1/2019 | Widner et al. |
| 2019/0016551 A1 | 1/2019 | Seay et al. |
| 2019/0018628 A1 | 1/2019 | Sloan, IV et al. |
| 2019/0018629 A1 | 1/2019 | Seay |
| 2019/0024315 A1 | 1/2019 | Bomstad et al. |
| 2019/0084266 A1 | 3/2019 | Grunwald et al. |
| 2019/0193368 A1 | 6/2019 | Eder et al. |
| 2020/0114668 A1 | 4/2020 | Havive et al. |
| 2021/0311677 A1 | 10/2021 | Sloan, IV et al. |

FOREIGN PATENT DOCUMENTS

| | | |
|---|---|---|
| CA | 2398171 A1 | 8/2001 |
| CN | 101124528 A | 2/2008 |
| CN | 201030576 Y | 3/2008 |
| CN | 101219723 A | 7/2008 |
| CN | 101977777 A | 2/2011 |
| CN | 102173162 A | 9/2011 |
| CN | 103286812 A | 9/2013 |
| CN | 203307684 U | 11/2013 |
| CN | 13465509 A | 12/2013 |
| CN | 103879026 A | 6/2014 |
| CN | 203919153 U | 11/2014 |
| CN | 106363962 A | 2/2017 |
| EP | 0875482 A1 | 11/1998 |
| EP | 0972639 B1 | 1/2000 |
| EP | 1132203 B1 | 9/2001 |
| EP | 0983853 B1 | 5/2003 |
| EP | 1459878 A2 | 9/2004 |
| EP | 1593502 B1 | 11/2005 |
| EP | 1655116 A1 | 5/2006 |
| EP | 1916102 B2 | 4/2008 |
| EP | 1956456 A1 | 8/2008 |
| EP | 2100732 A1 | 9/2009 |
| EP | 1459878 B1 | 7/2010 |
| EP | 2227396 B1 | 9/2010 |
| EP | 2250019 B1 | 11/2010 |
| EP | 2298552 B1 | 3/2011 |
| EP | 2429781 B1 | 3/2012 |
| EP | 2429782 B1 | 3/2012 |
| EP | 2551117 A2 | 1/2013 |
| EP | 2611614 B1 | 7/2013 |
| EP | 1243414 B2 | 12/2014 |
| EP | 2928651 A1 | 10/2015 |
| EP | 2964436 B1 | 1/2016 |
| EP | 3010717 B1 | 4/2016 |

(56) References Cited

FOREIGN PATENT DOCUMENTS

| | | |
|---|---|---|
| EP | 2428360 B1 | 3/2017 |
| GB | 2102769 A | 2/1983 |
| GB | 2542569 A | 3/2017 |
| GB | 2542645 A | 3/2017 |
| JP | S62-290527 A | 12/1987 |
| JP | H07137720 A | 5/1995 |
| JP | H11165814 A | 6/1999 |
| JP | 2000118797 A | 4/2000 |
| JP | 2000153802 A | 6/2000 |
| JP | 2002113971 A | 4/2002 |
| JP | 2002/233990 A | 8/2002 |
| JP | 2002-273800 A | 9/2002 |
| JP | 2002304426 A | 10/2002 |
| JP | 2003-245894 A | 9/2003 |
| JP | 2004-82279 A | 3/2004 |
| JP | 2007-245257 A | 9/2007 |
| JP | 2009154229 A | 7/2009 |
| JP | 2010158902 A | 7/2010 |
| JP | 4718981 B2 | 7/2011 |
| JP | 2012139952 A | 7/2012 |
| JP | 2015157375 A | 9/2015 |
| JP | 2015217535 A | 12/2015 |
| JP | 2016154008 A | 8/2016 |
| JP | 2017-035755 A | 2/2017 |
| KR | 2010-0138218 A | 12/2010 |
| KR | 101102628 B1 | 1/2012 |
| KR | 101518219 B1 | 5/2015 |
| TW | M271837 U | 8/2005 |
| WO | 2009/014818 A1 | 1/2009 |
| WO | 2012/065689 A1 | 5/2012 |
| WO | 2014/023487 A1 | 2/2014 |
| WO | 2014/206496 A1 | 12/2014 |
| WO | 2016/087053 A1 | 6/2016 |
| WO | 2016/165774 A1 | 10/2016 |
| WO | 2017/026135 A1 | 2/2017 |
| WO | 2017/051146 A1 | 3/2017 |
| WO | 2017/131720 A1 | 8/2017 |
| WO | 2017/178228 A1 | 10/2017 |

OTHER PUBLICATIONS

Chang et al., Proceedings of the 2003 Winter Simulation Conference, "Simulation-Based Scheduling Dynamic Discrete Manufacturing", retrieved from <https://www.researchgate.net/profile/Chin_Chong/publication/4053706_Dynamic_scheduling_I_simulation-based_scheduling_for_dynamic_discrete_manufacturing/links/0deec52a5c1c8a0a56000000/Dynamic-scheduling-I-simulation-based-scheduling-for-dynamic-discrete-manufacturing.pdf> 10 pages.

Lehtonen et al., Proccedings of the 2003 Winter Simulation Conference, "Simulation-Based Finite Scheduling at Albany International", retrieved from <https://pdfs.semanticscholar.org/71ab/4037976abb74e3874a158892e24254044970.pdf> 7 pages.

HP Development Company; "Reinventing End-to-end Solutions with HP and Our Partners", Product Brochure, Published 2016, pp. 24.

International Search Report and Written Opinion, PCT/US2018/042000, dated Nov. 7, 2018, 10 pages.

Invitation to Pay Additional Fees and, Where Applicable, Protest Fee, PCT/US2018/041992, dated Nov. 28, 2018, 15 pages.

International Search Report and Written Opinion, PCT/US2018/041990, dated Nov. 7, 2018, 13 pages.

International Search Report and Written Opinion, PCT/US2018/041988, dated Nov. 7, 2018, 12 pages.

International Search Report and Written Opinion, PCT/US2018/041992, dated Jan. 21, 2019, 20 pages.

Office Action received for Cn Application No. 201880037361.X. dated Feb. 26, 2021, 33 Pages. (19 Pages of English Translation and 14 pages of Official Notification).

Notification of Reasons for Refusal received for JP application No. 2020-500729, dated Jun. 7, 2022, 8 pages. (4 pages of english translation and 4 pages of official copy).

Notification of Reasons for Refusal received for JP application No. 2020-500840, dated Jun. 14, 2022, 12 pages. 6 pages of english translation and 6 pages of official copy).

REEL EDITOR FOR PRE-PRINT PAPER, SHEET, AND BOX MANUFACTURING SYSTEMS

CROSS REFERENCE TO RELATED APPLICATIONS

This application is a continuation of and claims priority to U.S. patent application Ser. No. 16/033,350, entitled "Reel Editor for Pre-Print Paper, Sheet, and Box Manufacturing Systems", filed Jul. 12, 2018; which claims priority to U.S. Provisional Patent Application No. 62/597,016, entitled "Reel Editor for Pre-Print Paper, Sheet, and Box Manufacturing Systems", filed Dec. 11, 2017; U.S. Provisional Patent Application No. 62/583,857, entitled "Reel Editor for Pre-Print Paper, Sheet, and Box Manufacturing Systems", filed Nov. 9, 2017; and U.S. Provisional Patent Application No. 62/532,483, entitled "Digital Pre-Print Paper, Sheet, and Box Manufacturing Systems", filed Jul. 14, 2017, each of which is hereby incorporated by reference in its entirety.

FIELD OF THE INVENTION

Example embodiments of the present invention generally relate to paper, sheet and box manufacturing systems and, more particularly, to reel editors for pre-print paper, sheet and box manufacturing systems.

BACKGROUND

Paper, sheet, and/or box manufacturing systems may often include print systems that print one or more images (e.g., symbols, marketing indicia, product information, etc.) on the product. For example, a roll of web product may pass through a printing press and receive one or more images. Such printing may occur after formation/processing of the product (e.g., a layered corrugate), often being called "post-print". Alternatively, such printing may occur prior to formation of the product (e.g., on a top layer prior to formation of the finished product), often being called "pre-print".

A reel map or control plan for the roll of web product may help define the desired specifications/images for the finished product, such as in accordance with one or more orders. Depending on the design of the reel map, there may be waste within the roll. Further, the printing press may produce one or more images of poor quality. It may be desirable to remove such waste or poor images at various points throughout the manufacturing process. In this regard, unnecessary waste can be removed and more efficient manufacturing of the finished product may occur.

BRIEF SUMMARY

Embodiments of the present invention provide systems for providing editing of printed web product, such as in conjunction with paper, sheet, and/or box manufacturing systems. While some of the description herein of example embodiments focuses on corrugated box manufacturing, some embodiments of the present invention are contemplated for extension into other product manufacturing, including other paper based product manufacturing, such as folded carton, beverage, labels, flexible paper, industrial bags, plates, cups, décor, and many others.

Some embodiments of the present invention contemplate a designed platform with various modules that can be used throughout the manufacturing process. For example, such modules/controllers can be used to aggregate orders and information to prepare one or more reel maps (e.g., reel plans) for processing a roll of web product through the manufacturing process. The reel map may include information regarding one or more orders on the particular roll of web product. For example, the reel map may help define the one or more images printed on the web product. The one or more images may then be checked for defects and the roll may be edited, such as to remove excess waste on the roll and/or poor images on the roll. In some embodiments, a reel editor may be used to perform the roll editing. Further, the reel map may be updated to account for the removed or changed portion of the roll of web product.

In some embodiments, the reel editor may be configured to determine if there is enough waste on the roll of web product to even making editing worthwhile, such as based on cost of removing the waste, cost of proceeding without removing the waste, desired quality of the images, customer requirements, different price points, among other possible factors.

In an example embodiment, a system for editing a roll of printed web product is provided. The system comprises a first winding station comprising a winding device that is configured to wind and unwind the roll of printed web product. The first winding station is configured to receive the roll of printed web product. The system further comprises a cutting station configured to enable one or more portions of the roll of printed web product to be removed. The system further comprises a second winding station that is configured to receive a tail end of the roll of printed web product and enable winding and unwinding of the roll of printed web product. The system further comprises a reel editor module configured to receive a control plan associated with the roll of printed web product. Each roll of printed web product is associated with a roll-specific control plan. The control plan comprises roll data that includes data corresponding to one or more printed orders on the roll of printed web product. The roll data comprises waste data that includes one or more locations of waste sections on the roll of printed web product. Each of the waste sections corresponds to at least one of waste on the roll of printed web product or unsatisfactory images that are printed on the roll of printed web product. The reel editor module is configured to control the first winding device to unwind the roll of printed web product to position a location of a waste section of the roll of printed web product at the cutting station for removal of the waste section to form an edited roll of printed web product. The reel editor module is configured to control at least one of the first winding device of the first winding station or a second winding device of the second winding station to wind the edited roll of printed web product after removal of the waste section. The reel editor module is configured to update the control plan associated with the roll of printed web product by updating the roll data based on the removed waste sections to form an updated control plan associated with the edited roll of printed web product.

In some embodiments, the reel editor module is further configured to control at least one of the first winding device or the second winding device to unwind the edited roll of printed web product at the second winding station and rewind the edited roll of printed web product at the first winding station to form an updated roll of printed web product that is rewound with a leading tail end on the outside circumference of the roll of printed web product.

In some embodiments, the reel editor module is configured to pull the control plan from a vision system module.

In some embodiments, the reel editor module is configured to provide the updated control plan to a corrugator control module for corrugation of the edited roll of printed web product.

In some embodiments, the reel editor module is configured to cause one or more labels to be printed, wherein the one or more labels include identification of the edited roll of printed web product.

In some embodiments, the roll data comprises a length of printed web product associated with an order section on the roll of printed web product, wherein each order section comprises at least one structure outline and at least one corresponding printed image within the at least one structure outline. Further, the reel editor module is configured to update the control plan by updating, in an instance in which a portion of an order section was removed, the roll data with an updated length of printed web product associated with the order section.

In some embodiments, the roll data comprises a number of box outlines associated with an order section on the roll of printed web product, wherein each order section comprises at least one structure outline and at least one corresponding printed image within the at least one structure outline. Further, the reel editor module is configured to update the control plan by updating, in an instance in which a portion of an order section was removed, the roll data with an updated remaining number of structure outlines associated with the order section on the edited roll of printed web product.

In some embodiments, the roll data comprises an overall length of printed web product on the roll of printed web product. The reel editor module is configured to update the control plan by updating the roll data with an updated overall length of printed web product based on an overall length of web product that was removed.

In some embodiments, the cutting station comprises a slitting section configured to enable slitting the roll of printed web product into one or more narrower rolls. In some embodiments, the roll of printed web product is slit into one or more narrower rolls based on one or more lanes that are indicated in the control plan. In some embodiments, the reel editor module is configured to update the control plan by generating a control plan for each of the one or more narrower rolls.

In some embodiments, the system further comprises one or more detectors for detecting one or more markers on the roll of printed web product. The reel editor module is configured to determine a current position of the roll of printed web product based on the detected one or more markers. In some embodiments, the one or more markers are color markers.

In another example embodiment, a system for editing a roll of printed web product is provided. The system comprises a controller and a memory including computer program product stored thereon. The computer program product is configured, when executed by the controller, to receive a control plan associated with the roll of printed web product. Each roll of printed web product is associated with a roll-specific control plan. The control plan comprises roll data that includes data corresponding to one or more printed orders on the roll of printed web product. The roll data comprises waste data that includes one or more locations of waste sections on the roll of printed web product. Each of the waste sections corresponds to at least one of waste on the roll of printed web product or unsatisfactory images that are printed on the roll of printed web product. The computer program product is further configured to control a first winding device to unwind the roll of printed web product to position a location of a waste section of the roll of printed web product at the cutting station for removal of the waste section to form an edited roll of printed web product. The computer program product is further configured to control at least one of the first winding device or a second winding device to wind the edited roll of printed web product after removal of the waste section. The computer program product is further configured to update, in the memory, the control plan associated with the roll of printed web product by updating the roll data based on the removed waste sections to form an updated control plan associated with the edited roll of printed web product.

In some embodiments, the computer program product is further configured, when executed by the controller, to control at least one of the first winding device or the second winding device to unwind the edited roll of printed web product at a first winding station and rewind the edited roll of printed web product at a second winding station to form an updated roll of printed web product that is rewound with a leading tail end on the outside circumference of the roll of printed web product.

In some embodiments, the roll data comprises a length of printed web product associated with an order section on the roll of printed web product, wherein each order section comprises at least one structure outline and at least one corresponding printed image within the at least one structure outline. Further, the computer program product is further configured, when executed by the controller, to update the control plan by updating, in an instance in which a portion of an order section was removed, the roll data with an updated length of printed web product associated with the order section.

In some embodiments, the roll data comprises a number of box outlines associated with an order section on the roll of printed web product, wherein each order section comprises at least one structure outline and at least one corresponding printed image within the at least one structure outline. Further, the computer program product is further configured, when executed by the controller, to update the control plan by updating, in an instance in which a portion of an order section was removed, the roll data with an updated remaining number of structure outlines associated with the order section on the edited roll of printed web product.

In some embodiments, in an instance in which the roll of printed web product is slit into one or more narrower rolls, the computer program product is further configured, when executed by the controller, to update the control plan by generating a control plan for each of the one or more narrower rolls.

In yet another example embodiment, a method for editing a roll of printed web product is provided. The method comprises receiving a control plan associated with the roll of printed web product. Each roll of printed web product is associated with a roll-specific control plan. The control plan comprises roll data that includes data corresponding to one or more printed orders on the roll of printed web product. The roll data comprises waste data that includes one or more locations of waste sections on the roll of printed web product. Each of the waste sections corresponds to at least one of waste on the roll of printed web product or unsatisfactory images that are printed on the roll of printed web product. The method further comprises controlling a first winding device to unwind the roll of printed web product to position a location of a waste section of the roll of printed web product at the cutting station for removal of the waste section to form an edited roll of printed web product. The method further comprises controlling at least one of the first winding device or a second winding device to wind the edited roll of printed web product after removal of the waste section. The method further comprises updating, in the memory, the control plan associated with the roll of printed web product by updating the roll data based on the removed waste sections to form an updated control plan associated with the edited roll of printed web product.

In some embodiments, the method further comprises controlling at least one of the first winding device or the second winding device to unwind the edited roll of printed web product at a first winding station and rewind the edited roll of printed web product at a second winding station to form an updated roll of printed web product that is rewound with a leading tail end on the outside circumference of the roll of printed web product.

In yet another example embodiment, a method for determining whether or not to edit waste from a roll of printed web product using a reel editor is provided. The method comprises receiving, from a vision system module of a manufacturing process, a control plan associated with the roll of printed web product. Each roll of printed web product is associated with a unique control plan. The control plan comprises roll data that includes order data and waste data. The waste data indicates one or more waste sections on the roll of printed web product. Each of the one or more waste sections corresponds to at least one of waste on the roll of printed web product or unsatisfactory images that are printed on the roll of printed web product. The order data corresponds to one or more printed orders on the roll of printed web product and includes at least one of cost associated with processing material for the order, customer data associated with the roll of printed web product, desired quality data associated with the roll of printed web product, or pricing data associated with the roll of printed web product. The method further comprises determining, by a processor, an amount of waste on the roll of printed web product based on the waste data of the control plan. The method further comprises determining, based on the order data of the control plan, a waste tolerance threshold for the roll of printed web product. The method further comprises determining if the determined amount of waste satisfies the determined waste tolerance threshold for the roll of printed web product. The method further comprises, in an instance in which the determined amount of waste satisfies the determined waste tolerance threshold for the roll of printed web product, providing an instruction to not edit the roll of printed web product at the reel editor such that no waste is removed via the reel editor.

In some embodiments, the method further comprises, in an instance in which the determined amount of waste does not satisfy the determined waste tolerance threshold for the roll of printed web product, providing an instruction to edit the roll of printed web product at the reel editor such that at least some of the waste is removed via the reel editor.

In some embodiments, providing the instruction to not edit the roll of printed web product comprises causing a notification to not edit the roll of printed web product to be at least one of sent to or presented on a display for an operator.

In some embodiments, providing the instruction to not edit the roll of printed web product comprises sending the control plan directly to a corrugator control module such that the control plan is not transmitted to a reel editor.

In some embodiments, the roll of printed web product comprises a plurality of order sections and each order section includes at least one structure outline and at least one image printed within each structure outline. The method further comprises determining an amount of waste by determining an amount of waste for each order section. The method further comprises determining a waste tolerance threshold by determining a waste tolerance threshold for each order section. The method further comprises determining if the determined amount of waste satisfies the determined waste tolerance threshold by determining if the determined amount of waste satisfies the determined waste tolerance threshold for each order section. In some embodiments, providing the instruction to not edit the roll of printed web product at the reel editor comprises providing the instruction in an instance in which the determined amount of waste satisfies the determined waste tolerance threshold for all of the order section on the roll of printed web product. In some embodiments, providing the instruction to not edit the roll of printed web product at the reel editor comprises providing the instruction in an instance in which the determined amount of waste satisfies the determined waste tolerance threshold for a predetermined number of order sections on the roll of printed web product.

In some embodiments, determining the waste tolerance threshold comprises determining the waste tolerance threshold based on a desired quality of one or more orders on the roll of printed web product.

In some embodiments, determining the waste tolerance threshold comprises determining the waste tolerance threshold based on an estimated cost of removing waste from the roll of printed web product using the reel editor.

In some embodiments, determining the waste tolerance threshold comprises determining the waste tolerance threshold based on a pricing of one or more orders on the roll of printed web product.

In some embodiments, the method further comprises providing at least one of waste data or an indication of a result of determining if the determined amount of waste satisfies the determined waste tolerance threshold for the roll of printed web product to a customer insight module that is configured to generate one or more reports using the waste data or the result.

In yet another example embodiment, a system for determining whether or not to edit waste from a roll of printed web product using a reel editor is provided. The system comprises a controller and a memory including computer program product stored thereon. The computer program product is configured, when executed by the controller, to receive, from a vision system module of a manufacturing process, a control plan associated with the roll of printed web product. Each roll of printed web product is associated with a unique control plan. The control plan comprises roll data that includes order data and waste data. The waste data indicates one or more waste sections on the roll of printed web product. Each of the one or more waste sections corresponds to at least one of waste on the roll of printed web product or unsatisfactory images that are printed on the roll of printed web product. The order data corresponds to one or more printed orders on the roll of printed web product and includes at least one of cost associated with processing material for the order, customer data associated with the roll of printed web product, desired quality data associated with the roll of printed web product, or pricing data associated with the roll of printed web product. The computer program product is further configured to determine, by a processor, an amount of waste on the roll of printed web product based on the waste data of the control plan. The computer program product is further configured to determine, based on the order data of the control plan, a waste tolerance threshold for the roll of printed web product. The computer program product is further configured to determine if the determined amount of waste satisfies the determined waste tolerance threshold for the roll of printed web product. The computer program product is further configured to, in an instance in which the determined amount of waste satisfies the determined waste tolerance threshold for the roll of printed web product, provide an instruction to not edit the roll of printed web product at the reel editor such that no waste is removed via the reel editor.

In some embodiments, the computer program product is further configured, when executed by the controller, to, in an instance in which the determined amount of waste does not satisfy the determined waste tolerance threshold for the roll of printed web product, provide an instruction to edit the roll of printed web product at the reel editor such that at least some of the waste is removed via the reel editor.

In some embodiments, the computer program product is further configured, when executed by the controller, to provide the instruction to not edit the roll of printed web product by causing a notification to not edit the roll of printed web product to be at least one of sent to or presented on a display for an operator.

In some embodiments, the computer program product is further configured, when executed by the controller, to provide the instruction to not edit the roll of printed web product by sending the control plan directly to a corrugator control module such that the control plan is not transmitted to a reel editor.

In some embodiments, the roll of printed web product comprises a plurality of order sections and each order section includes at least one structure outline and at least one image printed within each structure outline. The computer program product is further configured, when executed by the controller, to determine an amount of waste by determining an amount of waste for each order section. The computer program product is further configured to determine a waste tolerance threshold comprises determining a waste tolerance threshold for each order section. The computer program product is further configured to determine if the determined amount of waste satisfies the determined waste tolerance threshold comprises determining if the determined amount of waste satisfies the determined waste tolerance threshold for each order section. In some embodiments, the computer program product is further configured, when executed by the controller, to provide the instruction to not edit the roll of printed web product at the reel editor by providing the instruction in an instance in which the determined amount of waste satisfies the determined waste tolerance threshold for all of the order section on the roll of printed web product. In some embodiments, the computer program product is further configured, when executed by the controller, to provide the instruction to not edit the roll of printed web product at the reel editor by providing the instruction in an instance in which the determined amount of waste satisfies the determined waste tolerance threshold for a predetermined number of order sections on the roll of printed web product.

In some embodiments, the computer program product is further configured, when executed by the controller, to determine the waste tolerance threshold by determining the waste tolerance threshold based on a desired quality of one or more orders on the roll of printed web product.

In yet another example embodiment, a system for determining whether or not to edit waste from a roll of printed web product using a reel editor is provided. The system comprises a first winding station comprising a winding device that is configured to wind and unwind the roll of printed web product, wherein the first winding station is configured to receive the roll of printed web product. The system further comprises a cutting station configured to enable one or more portions of the roll of printed web product to be removed. The system further comprises a second winding station that is configured to receive a tail end of the roll of printed web product and enable winding and unwinding of the roll of printed web product. The system further comprises a reel editor module configured to receive, from a vision system module of a manufacturing process, a control plan associated with the roll of printed web product. Each roll of printed web product is associated with a unique control plan. The control plan comprises roll data that includes order data and waste data. The waste data indicates one or more waste sections on the roll of printed web product. Each of the one or more waste sections corresponds to at least one of waste on the roll of printed web product or unsatisfactory images that are printed on the roll of printed web product. The order data corresponds to one or more printed orders on the roll of printed web product and includes at least one of cost associated with processing material for the order, customer data associated with the roll of printed web product, desired quality data associated with the roll of printed web product, or pricing data associated with the roll of printed web product. The reel editor module is further configured to determine, by a processor, an amount of waste on the roll of printed web product based on the waste data of the control plan. The reel editor module is further configured to determine, based on the order data of the control plan, a waste tolerance threshold for the roll of printed web product. The reel editor module is further configured to determine if the determined amount of waste satisfies the determined waste tolerance threshold for the roll of printed web product. The reel editor module is further configured to, in an instance in which the determined amount of waste satisfies the determined waste tolerance threshold for the roll of printed web product, provide an instruction to not edit the roll of printed web product at the reel editor such that no waste is removed via the reel editor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
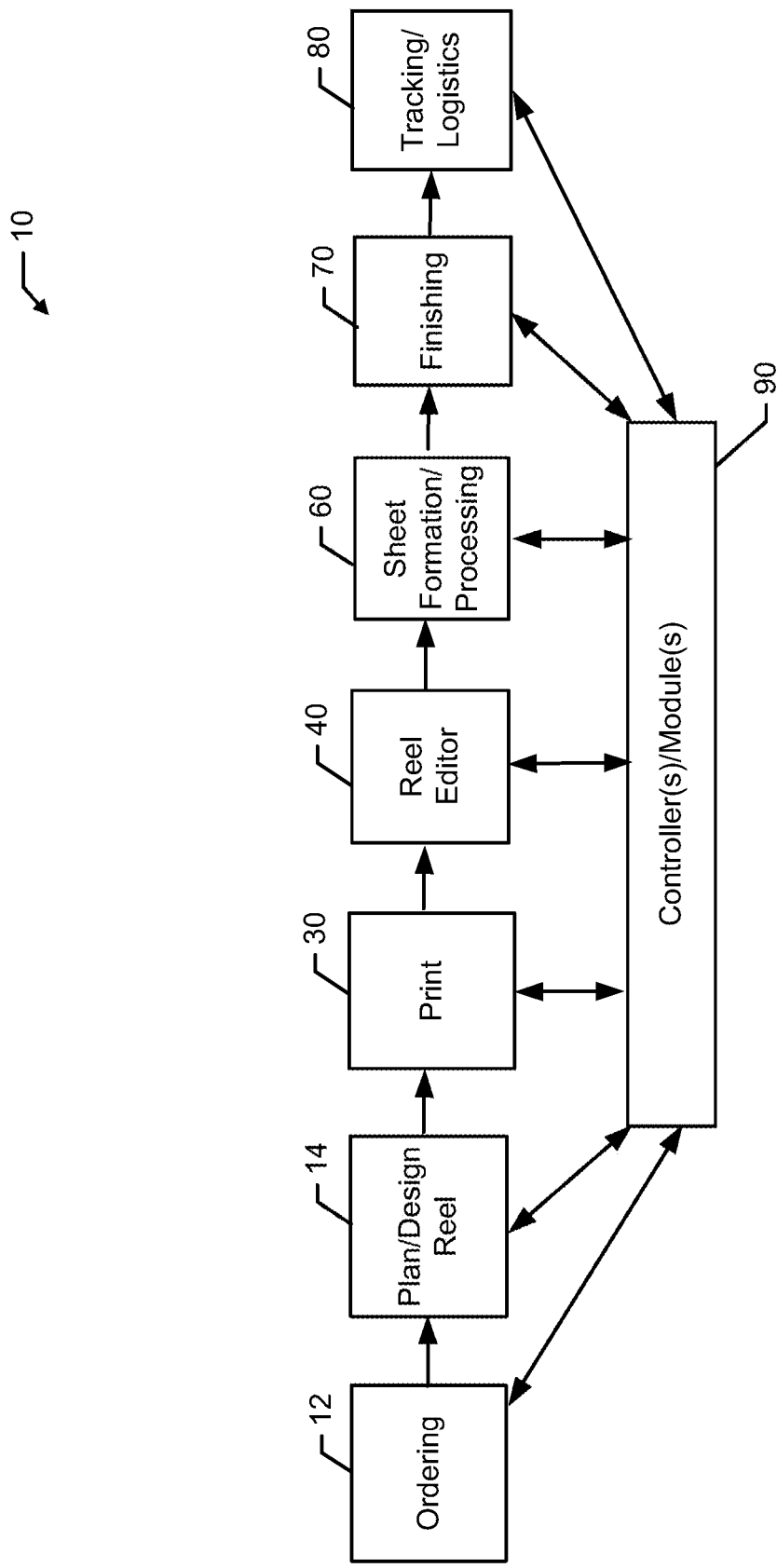
FIG. 1 shows a block diagram of an example paper, sheet, and/or box manufacturing process, in accordance with some embodiments discussed herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Example Paper, Sheet, or Box Manufacturing Process

FIG. 1 illustrates an example paper, sheet, or box manufacturing process 10 to form one or more paper-based products, according to various embodiments of the present invention. The manufacturing process 10 includes a number of phases that result in a finished product that is shaped and printed per the customer's order. The process 10 may include an ordering phase 12, a planning phase 14, a print phase 30, a reel editor phase 40, a sheet formation/processing phase 60, a finishing phase 70, and a tracking/logistics phase 80.

Depending on the desired configuration, one or more controller(s) 90 may be used to control one or more various phases (e.g., various systems/devices therein) of the manufacturing process 10. In some embodiments, less or more phases or different orders of phases are contemplated. Some embodiments of the present invention are contemplated for any type of paper, sheet, or box product manufacturing, including printed paper-based product manufacturing, such as corrugate, folded carton, beverage labels, flexible paper, industrial bags, plates, cups, décor, and many others.

In some embodiments, the controller 90 may be configured to control operation of one or more printing presses during the printing phase 30, operation of one or more reel editor(s) for one or more lanes during the reel editor phase 40, operation of various components used during the sheet formation/processing phase 60, and/or operation of various components used during the finishing phase 70. Likewise, the controller 90 may be used with the ordering phase 12 and/or during the tracking/logistics phase 80, such as described herein. In some embodiments, the controller 90 may be spread over any number of controllers at any of the various phases of the manufacturing process 10.

As described in more detail herein, the controller 90 provides logic and control functionality used during operation of various components/phases of the manufacturing process 10. In some embodiments, the functionality of the controller 90 may be distributed to several controllers that each provides more limited functionality to discrete portions of the operation of manufacturing process 10.

The controller 90 may comprise one or more suitable electronic device(s)/server(s) capable of executing described functionality via hardware and/or software control. In some embodiments, the controller 90 may include one or more user interfaces (not shown), such as for displaying information and/or accepting instructions. The controller 90 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The controller 90 may include one or more processors coupled to a memory device. Controller 90 may optionally be connected to one or more input/output (I/O) controllers or data interface devices (not shown). The memory may be any suitable form of memory such as an EPROM (Erasable Programmable Read Only Memory) chip, a flash memory chip, a disk drive, or the like. As such, the memory may store various data, protocols, instructions, computer program code, operational parameters, etc. In this regard, controller may include operation control methods embodied in application code. These methods are embodied in computer instructions written to be executed by one or more processors, typically in the form of software. The software can be encoded in any suitable language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In this regard, in some embodiments, the controller 90 may be configured to execute computer program code instructions to perform aspects of various embodiments of the present invention described herein.

In the ordering phase 12, a customer may supply an order that includes desired characteristics for the end product. For example, the customer may provide a number of desired sheet, paper, or box structures (including for example labels, cartons, bags, plates, cups, décor, etc.), shape requirements, one or more images/designs for printing on the structures, color specifications, among many others. In some embodiments, the customer may input such an order through a web interface. The web interface may enable the customer to easily input the desired characteristics of the order electronically, such as forming a design for the desired end product (s). The web interface may also enable the customer to perform many related tasks, including, for example, updating orders, tracking orders, handling payment, requesting assistance, setting up automated ordering (e.g., recurring ordering), viewing and approving example images ("soft proofing"), viewing example end products, etc.

In addition to providing increased efficiency of process for the customer, the web interface may also directly interact with and provide information for automated processes useful in the remainder of the manufacturing process 10. For example, the information from the web interface may be fed directly into a controller 90 and utilized accordingly. For example, as described herein, the information from the web interface may be used to form a control plan (e.g., reel map, print plan, process plan, etc.) for a planned roll of web product (such as may be used to form the desired end product(s)). Additionally, however, the information from the web interface may be used to provide on-the-fly updates or adjustments to the manufacturing process. Further, feedback (e.g., from the controller 90) may be provided back to the web interface for the customer, such as tracking information, images of the completed sheet or box structures, among other things.

In some embodiments, the controller 90 may be configured to aggregate received orders, such as in one or more databases.

In some embodiments, the controller 90 (such as during the planning phase 14) may be configured to generate (e.g., form) a control plan associated with a roll of web product. In some embodiments, a control plan may be electronic-based (e.g., an electronic map/plan/table/listing/etc.) that is reference-able for determining how the various components of the manufacturing process 10 should operate—such as to form the desired product through the manufacturing process 10.

In some embodiments, the controller 90 may be configured to generate a control plan associated with a roll of web product for at least one order for the one or more paper-based products from among a plurality of orders. In this regard, each order of the plurality of orders may comprise at least one design for at least one paper-based product, and the design may include one or more printed images (such as for being printed on the desired product).

In some embodiments, the control plan includes one or more sets of order instructions. In some embodiments, each set of order instructions may correspond to a different order that is planned to be manufactured using the generated control plan. For example, a control plan may include a set of first order instructions for forming a first paper-based product from the roll of web product for fulfilling a first order. Additionally, in some embodiments, a control plan may have a second or more sets of order instructions, such as to control manufacturing of additional products. In some cases, depending on the size restrictions of the order and/or the systems used during the manufacturing process, the control plan may be generated such that different orders are positioned or planned to be adjacent to each other in a width direction (e.g., next to each other) on a roll of web product. Additionally or alternatively, the control plan may be generated such that different orders are positioned or planned to run one after the other in a length direction on a roll of web product.

The order instructions for the control plan for each order may include one or more instructions, specification, databases, etc. for enabling control and/or operation of various systems/devices of the manufacturing process 10. For example, the set of first order instructions may comprise first plan instructions for forming one or more first sheet or box structure areas on the roll of web product. Further, the first plan instructions may include one or more printed images for each of the first sheet or box structure areas. Ultimately, in some embodiments, the plan instructions (and other instructions) that form the set of order instructions may be used during the manufacturing process 10 to form the desired product.

In some embodiments, a control plan (such as through the plan instructions) may provide a layout of the order and/or arrangement of sheet or box structure areas on a roll of web product that are to be printed on, formed, and/or cut during the manufacturing process 10. For example, a control plan (e.g., reel map) for the section of web product 220 shown in FIG. 3A may include indications that there should be 4 structures (A, B, C, and D) that are arranged as shown. In some embodiments, the control plan (or a portion thereof) may be representable in visual form, such as to a person (or persons), which may be useful for manually checking the control plan for accuracy, efficiency, and/or operating the corrugator. In some embodiments, electronic verification of such checking could occur either with or without the visual representation of the control plan.

The manufacturing process 10 may also including the printing phase 30. Depending on the desired manufacturing process 10, digital print processes can be used, providing for enhanced image quality. During the printing phase 30, the controller 90 may direct the press digital front end (DFE) and raster image processor (RIP), etc., to print one or more images at specific locations on the web product. In some embodiments, the controller 90 may utilize the control plan to determine where on the web to print the images and/or markers. In some embodiments, the controller 90 may provide the control plan to the printer for operation thereof to cause the printer to print the desired image at an appropriate position on the roll of web product (e.g., within each sheet or box structure area)—thereby forming a roll of printed web product. For example, an image selected by the customer (such as a bottle), may be printed in the center (or other section) of a structure—such as may ultimately be visible for marketing or other purposes once the structure is formed. Any image (including, words, marks, instructions, etc.) is contemplated by various embodiments of the present invention.

In some embodiments, one or more markers can be printed on the web product, including any marker that may be used by various components of the manufacturing process 10, such as for tracking, cutting, printing, etc. Further description regarding possible markers and their utilization is provided in greater detail herein. In this regard, the controller 90 may be connected to one or more vision systems that are used to read or detect color, defects, structure, and various markers for controlling and/or operating various components/phases of the manufacturing process 10.

During the reel editor phase 40, the controller 90 may direct operation of a reel editor to edit (e.g., remove) waste from the roll of printed web product. For example, the controller 90 (such as during the print phase 30 and/or a separate/different phase) may be configured to determine waste that is on the roll of printed web product. Such waste could be unprinted sections of the roll and/or poor quality images/defects in the roll.

In some embodiments, the controller 90 is configured to provide the control plan to at least one reel editor for controlling operation of the reel editor. In such an example embodiment, the control plan may include editing instructions (e.g., within the set of order instructions) to control operation of the reel editor to cause one or more portions of the roll of printed web product to be removed. In some embodiments, the editing instructions may cause the reel editor to slit the roll of web product into more than one child roll (e.g., narrower in paper width) and/or to break the roll of web product into more than one child roll (e.g., narrower in paper roll diameter). Such child rolls may be designed for processing through various manufacturing systems downstream and may, in some instances, assist in tracking and/or order management.

Once edited, the controller 90 may determine and update the control plan to account for any removed waste and/or one or more newly formed child roll(s).

During the sheet formation/processing phase 60, the controller 90 may be configured to perform one or more processes to form and/or process the roll of web product in formation of the desired end product. In some embodiments, the controller 90 may be configured to provide the control plan to at least one sheet formation/processing system for controlling operation of the sheet formation/processing system. The sheet formation/processing system may include one or more systems for the formation/processing of the roll of web product, such as forming the roll of web product into one or more sheets (or structures) that may be utilized in the remainder of the manufacturing process 10.

As used herein, "sheet formation/processing" may refer to any formation or processing of a sheet or structure from a roll of web product, such as for example cutting/forming a rectangular shaped structure that can be, in some embodiments, further processed (e.g., in the finishing phase) to form (or help form) one or more paper-based products. In some embodiments, during the sheet formation/processing phase 60, the roll of web product (or portions thereof) may be formed into additional layered product that can be cut into sheets, such as when processed through a corrugator. In some embodiments, further processing may occur during the sheet formation/processing phase 60 and/or finishing phase 70. For example, the formed sheet may be die-cut, such as during either phase.

In some embodiments, the sheet formation/processing system may include a web forming device that is configured to use the roll of printed web product to form an updated web. The control plan (such as in the set of order instructions) may include web forming instructions to control operation of the web forming device to cause the updated web to be formed. In some example embodiments, the updated web may include additional layers of material (e.g., additional webs for added support, glue, fluting, lamination, etc.). In this regard, the updated web may be used for forming the desired end product.

In some embodiments, the sheet formation/processing system may include at least one cutting arrangement (e.g., one or more cutting devices) that is configured to cut a portion of the roll of printed web product. The control plan (such as in the set of order instructions) may include cutting instructions to control operation of the cutting arrangement to cause one or more sheet or box structures with the printed image therein to be cut from the roll of printed web product. In such an example, the one or more sheet or box structures with the first printed image therein may then be utilized to form the desired paper-based product for fulfilling the order.

For example, as described in greater detail herein, an example manufacturing process is corrugated box manufacturing and that manufacturing process may include a board making phase and/or cutting phase (see e.g., FIGS. 4A and 4B). In such an example, the board making phase may be performed under operation of one or more web forming devices (e.g., using a corrugator). Additionally, the cutting phase may be performed under operation of one or more cutting devices (e.g., using a corrugator). In some embodiments, other manufacturing processes are also contemplated—providing different sheet formation/processing phases 60, such as for use with carton formation, plate formation, cup formation, bag formation, etc.

Referring back to FIG. 1, with the sheets formed/processed, the manufacturing process 10 may continue to the finishing phase 70. The finishing phase 70 may include additional printing, additional cutting (e.g., die-cutting), additional scoring, additional gluing, and/or other necessary functions to achieve a finished product for sending to the customer.

In some embodiments, the controller 90 is configured to provide the control plan to at least one finishing system for controlling operation of the finishing system. The control plan (such as in the set of order instructions) may include finishing instructions to control operation of the finishing system to cause one or more products to be formed, such as using the sheets from the sheet formation/processing phase.

In some embodiments, the finishing system may comprise a die-cutter for forming a shaped sheet and/or product. In such an example, the finishing instructions from the control plan may cause the die-cutter to cut the sheet and/or roll from the sheet formation/processing phase 60 into a desired shape.

In some embodiments, the finishing system may comprise a folding/gluing device that is configured to fold and/or glue the one or more sheet or box structures for use in formation of the one or more desired products (e.g., folded cartons). In such an example, the finishing instructions from the control plan may cause the folding device to fold and glue the one or more sheet or box structures into the one or more folded cartons.

In some embodiments, the finishing system may comprise a tuber device that is configured to form the one or more sheet or box structures into one or more tubes and/or a bottoming device that is configured to form a bottom for each of the one or more tubes for use in formation of the desired products (e.g., an industrial bag). In such an example, the finishing instructions from the control plan may cause the tuber device to form the one or more sheet or box structures into one or more tubes and the bottoming device to form a bottom of each tube for use in formation of the desired product.

In some embodiments, the finishing system may comprise a cup forming device that is configured to form the one or more sheet or box structures into one or more desired products (e.g., cups). In such an example, the finishing instructions from the control plan may cause the cup forming device to form the one or more sheet or box structures into one or more cups.

In some embodiments, the finishing system may comprise a plate forming device that is configured to form the one or more sheet or box structures into one or more desired products (e.g., paper plates). In such an example, the finishing instructions from the control plan may cause the plate forming device to form the one or more sheet or box structures into one or more plates.

In some embodiments, the controller 90 is configured to determine if the one or more products formed by the finishing system satisfy a particular order. For example, in some embodiments, a vision system or other visual inspection system may be used to confirm accuracy and/or separating of the order(s) during the manufacturing process.

The manufacturing process 10 may also include a tracking/logistics phase 80 that includes tracking the finished sheet or box structures and/or preparing/delivering them to the customer. In some embodiments, one or more tracking or counting systems can be implemented upstream in the manufacturing process 10, such as to enable tracking/logistic planning throughout the manufacturing process 10. In such a regard, in some embodiments, the controller 90 is configured to track one or more webs/sheets/products during the manufacturing process 10. In some embodiments, unique codes based on the product type (e.g., corrugate, folded carton, industrial bag, plate, cup, décor, etc.) may be used to differentiate control plans and manufacturing processes.

Example Platform for Managing Manufacturing

Figure 2:
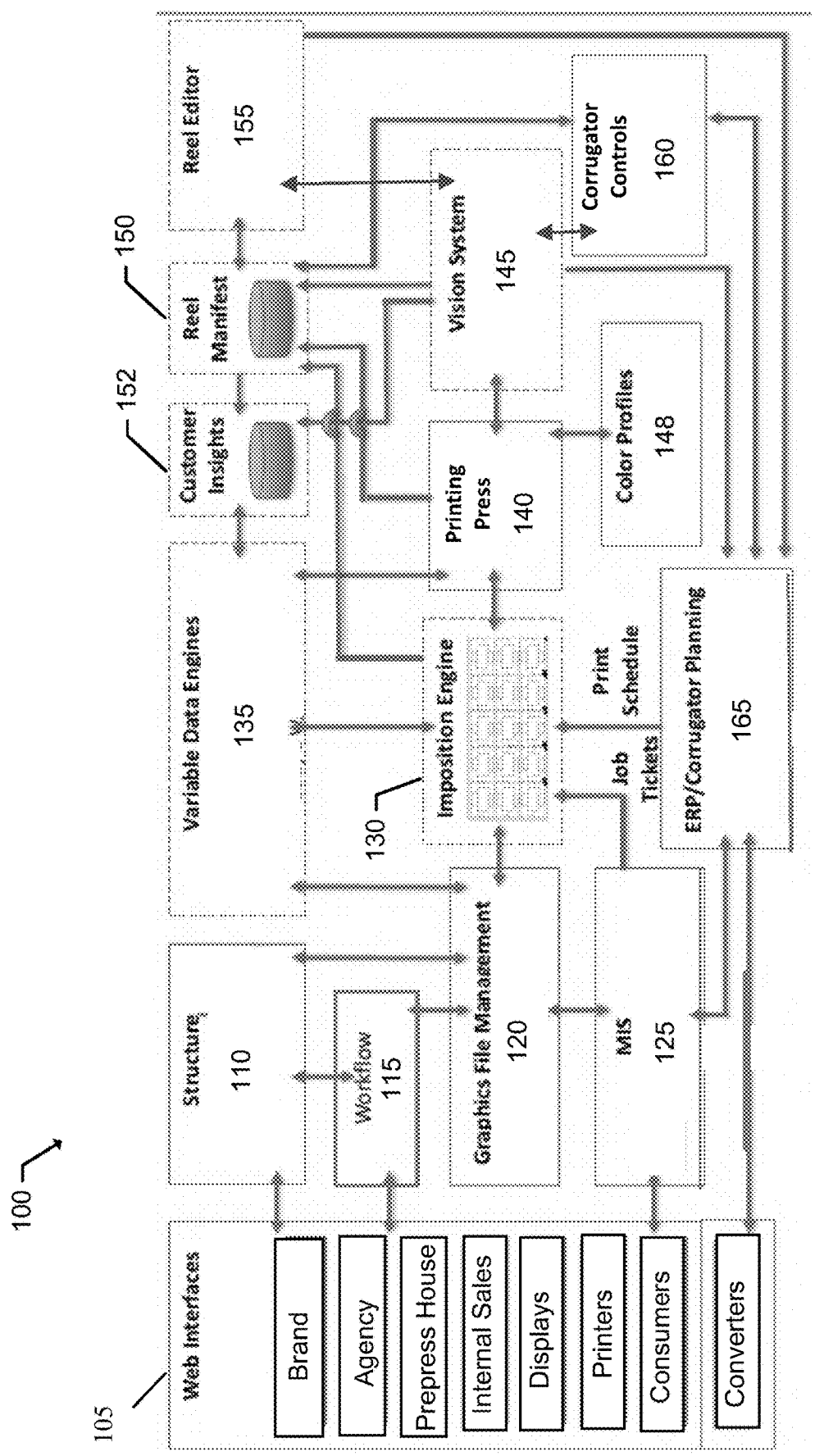
FIG. 2 shows an example platform for various aspects of a corrugated box manufacturing process, in accordance with example embodiments described herein.

FIG. 2 illustrates an example platform 100 for managing paper, sheet, or box manufacturing according to various embodiments of the present invention. Though some of the following description is provided for example corrugated box manufacturing, some embodiments of the present invention contemplate use of the platform (or various aspects of the platform) for any product manufacturing, such as corrugated boxes, folded carton, beverage containers, labels, flexible paper, industrial bags, plates, cups, décor, and many others.

The platform 100 includes a number of platform modules that interact with each other to form an integrated platform that provides efficient manufacturing processes. In the depicted embodiment, the platform 100 includes a web interface module 105, a structure module 110, a graphics file workflow module 115, a graphics file management module 120, a management information systems (MIS) module 125, an imposition engine module 130, a variable data engine module 135, a press module 140, a color management module 148, a press vision system module 145, a reel manifest module 150, a customer insights module 152, a reel editor module 155, a corrugator controls module 160, and an enterprise resource planning (ERP)/corrugator planning module 165. As described herein, the various modules each contain features that are designed to work together to provide an integrated, efficient platform 100 for manufacturing corrugated sheet or box structures for customers. In some embodiments, the controller 90 may be configured to communicate with and/or control operation of many of the various modules. While the depicted embodiment shows various particular modules, some embodiments of the present invention contemplate many variations, including additional modules and combinations in whole or part of shown modules to form a platform.

The web interface module 105 may be configured to provide for interaction between customers, users, and the platform 100. For example, the web interface module 105 may be configured to provide an interface for a customer to provide information to the platform 100, such as orders, changes to orders, payments, etc. The web interface module may also enable additional features, such as enabling a customer to print samples, upload their own art/images, track orders, among other things. Additionally, however, the web interface module 105 may be helpful for internal use, such as for tracking sales. The internal web interface may display pertinent information to the company, such as trends, etc. The web interface module 105 may communicate, for example, with the structure module 110, the workflow module 115, the management information systems module 125, and/or the ERP/corrugator planning module 165.

The structure module 110 may be configured to enable selection and design of the structures planned for manufacture. For example, the structure module 110 may enable selection of the types of boxes (e.g., the material, number of layers, flute medium, etc.). Additionally, the size and shape of the sheet or box structure may be configured using the structure module 110. In some embodiments, preferred structure specifications may be stored by the structure module 110. Further, rules or other constraints may be communicated to the customer and/or utilized in determination of the sheet or box structure specifications. The structure module 110 may communicate, for example, with the web interface module 105, the workflow module 115, and/or the graphics file management module 120.

The workflow module 115 may be configured to help process the flow of graphics orders and facilitate input of the orders into the structure module 110 and the graphics file management module 120. In this regard, the workflow module 115 may communicate with the web interface module 105, the structure module 110, and/or the graphics file management module 120.

The graphics file management module 120 may be configured to help process the graphics files for use in designing and printing on the sheet or box structures. For example, the graphics file management module 120 may include a repository of available images. Likewise, the graphics file management module 120 may store new images uploaded by the customer. Further, the graphics file management module 120 may include rules or other feature constraints that can be communicated to the customer and/or implemented when forming the orders. The graphics file management module 120 may communicate, for example, with the structure module 110, the workflow module 115, the management information system module 125, the color management module 148, and/or the imposition engine 130.

The management information system module 125 may be configured to store, process, and organize the information for the platform 100. For example, the management information systems module 125 is configured to receive and organize the orders, other customer requests, and internal information from the web interface module 105. Further, the data from the graphics file management module 120, imposition engine module 130, and enterprise resource planning (ERP)/corrugator planning module 165 may be stored and organized using the management information systems module 125. The management information systems module 125 may communicate, for example, with the web interface module 105, the graphics file management module 120, the imposition engine 130, and/or the ERP/corrugator planning module 165.

The enterprise resource planning (ERP)/corrugator planning module 165 may be configured to facilitate planning and implementation of the manufacturing process. In this regard, the ERP/corrugator planning module 165 may receive data from various features of the platform 100 and process the information to plan out efficient manufacturing processes across the entire platform. For example, the ERP/corrugator planning module 165 may receive data from the web interface module 105, the management information systems module 125, the press module 140, the vision system module 145, the corrugator controls module 160, and reel editor module 155 to inform planning for future jobs. As an example, the management information systems module 125 may provide order information to the ERP/corrugator planning module 165, which can be utilized to form job tickets for the imposition engine module 130. The ERP/corrugator planning module 165 may also be configured to enable printing of schedules for jobs etc.—which may be used for tracking or other purposes. Such information, for example, may be used to provide information back to the customer, such as through the web interface module 105. The ERP/corrugator planning module 165 may communicate, for example, with the web interface module 105, the management information systems module 125, the imposition engine module 130, the press module 140, the vision system module 145, the reel editor module 155, and/or the corrugator controls module 160.

The imposition engine module 130 may be configured to plan out imposition of print objects (e.g., images or markers) and other variable data on the roll of web product. For example, the imposition engine module 130 may gather ready job tickets (e.g., customer orders), such as from the management information systems module 125 and/or ERP/corrugator planning module 165, for imposition across rolls of web product. Using the job tickets, the imposition engine module 130 may determine layouts for the webs that minimize waste and improve processes. In order to plan out and finalize impositions, the imposition engine module 130 may receive information from various other modules, such as the graphics file management module 120, the variable data engine module 135, and the reel manifest module 150.

In some embodiments, the imposition engine module 130 may provide the ability to test roll layouts and finalize acceptable roll layouts. In this regard, formation of the layouts may be optimized based on many different factors, including, for example, roll/sheet/finished box requirements, press limitations, downstream corrugation, die-cut optimization, among other things. After finalization, the imposition engine module 130 may be configured to pass the imposed layout to the press module 140 for printing.

The imposition engine module 130 may communicate, for example, with the graphics file management module 120, the management information systems module 125, the ERP/corrugator planning module 165, the variable data engine module 135, the reel manifest module 155, and the press module 140.

The variable data engine module 135 may be configured to manage markers and other variable data through the manufacturing process. As described herein, some embodiments of the present invention contemplate use of markers for automated control during the manufacturing process, such for automated control/operation of the reel editor. Depending on the configuration of the manufacturing process, different markers or other variable data may be utilized to achieve automated control. The variable data engine module 135 may be configured to track, organize, determine, and report on such markers or other variable data.

In some embodiments, the variable data engine module 135 may be a web-based back-office function that assigns/allocates, references, and/or reports on variable data/marker information utilization. Such a module may enable generation and allocation of group (multi-use) individual barcodes, quick response (QR) codes, watermarks, color markers, and general variable data. In some embodiments, the variable data engine module 135 may assign/allocate variable data/markers by various entities, such as brand, product type, printer type, converter type, corrugator, logistics supply chain, or other factors.

In some embodiments, the variable data engine module 135 may transfer such information to the imposition engine module 130 for imposing on the board or web layout. In some embodiments, downstream information can be provided back to and utilized by the variable data engine module 135, such as information from the vision system module 145, reel editor module 155, corrugator, finishing equipment, logistics control, retailer, brand, and/or customer. Likewise, status updates can be provided to and from the variable data engine module 135.

In some embodiments, the data generated by the variable data engine module 135 may be tracked and utilized for reporting and determination of optimized processes. Further analytics and usage reporting may be generated. Along these lines, such information and learnings may be applicable to manufacturing of other products, such as also contemplated herein.

The variable data engine module 135 may communicate, for example, with the graphics file management module 120, the imposition engine module 130, the customer insights module 152, and the press module 140.

The press module 140 may be configured to print objects (e.g., images and markers) on the roll of web product, such as during the printing phase 30 described herein. Depending on capabilities of the press, different image qualities and efficiencies may be achieved. The press module 140 may be configured to communicate with, for example, the imposition engine module 130, the variable data engine module 135, the reel manifest module 150, the vision system module 145, and the color profiles module 148.

The color management module 148 may be configured to store and provide color profile information for the press module 140. In this regard, the color profiles module 148 may manage specific color profiles for customers, presses, substrates, or other requirements, that are then used by the press during printing. The color management module 148 may be configured to communicate with, for example, the graphics file management module 120 and the press module 140.

The vision system module 145 may be configured to perform many different types of vision (e.g., detection) related functions during the manufacturing process 10. In this regard, the vision system module 145 may be configured for use during the printing process and/or during use of the reel editor or other components of the manufacturing process 10. In describing such an example vision system module 145, some embodiments of the present invention contemplate separating described functions of the vision system module. For example, a portion of the vision system module 145 may be used during the printing process, while another portion of the vision system module 145 may be used in conjunction with operation of the reel editor or other component. Likewise, there may be separate functions performed by separate vision system related components (e.g., a visual inspection system may inspect the sheet or box structures for accuracy and a detector may detect one or more markers). As such, though described as one module, the following description is not meant to limit the structure of the modules of the platform 10, as there may be separate vision related modules as appropriate.

The vision system module 145 may be configured to detect information during the manufacturing process, such as during use of the printing process. In some embodiments, the vision system module 145 may be configured to detect possible defects and/or confirm accuracy of print jobs. In such a regard, high quality can be maintained (e.g., confirming color consistency on orders). For example, the vision system module 145 may detect defects, such as serious banding, print registration color-to-color, spit-on-page issues, bar/QR code scanability, over-print varnish issues.

In some embodiments, the vision system module 145 may be configured to detect information during the manufacturing process 10, including during the printing phase 30, reel editor phase 40, and/or product formation/processing phase 60. For example, the vision system module 145 may detect any defects or issues with the various components of the manufacturing process 10 (e.g., the printer, reel editor, or other component). Additionally, the vision system module 145 may communicate potential issues in real time to the controller 90 to adjust operation to address any issues. By detecting and communicating such issues, the controller 90 may adapt operation to avoid unnecessary waste. Along these lines, in some embodiments, the controller 90 may work with the various modules of the platform 100 to switch production, such as to a different portion of a reel map to avoid down time. In this regard, the vision system module 145 provides for the ability for on-the-fly adjustments during the manufacturing process.

In some embodiments, the vision system module 145 may be configured to detect various markers as the roll of web product progress through various components (e.g., through the printer, reel editor, a corrugator, etc.). Based on the detected markers, the vision system module 145 may provide information to the controller 90 for operation/control accordingly. Further, such information can be used for tracking orders and status.

In some embodiments, photographs (e.g., digital images) can be taken and stored for evidence or additional learning. In some embodiments, the photographs could be automatically provided to the customer for verification and auditing purposes.

In some embodiments, the vision system module 145 is configured to update the graphics file management module 120 to store and/or access golden reference images for print quality comparison.

The vision system module 145 may be configured to communicate, for example, with the press module 140, the customer insights module 152, the reel manifest module 150, and/or the ERP/corrugator planning module 165.

The customer insights module 152 may be configured to determine insights that may be useful for obtaining efficiencies, such as for a customer. The insights may be related to, for example, trends for customers, trends that the customer may find desirable, suggestions for the customer for future orders, etc. Additionally or alternatively, the insights may be related to achieving efficiencies for preparing product for specific customers. For example, the customer may indicate that certain "defects" are not important or not really defects as recognized by the vision system module 145.

In some embodiments, the customer insights module 152 may track and utilize non-customer specific information, such as for determining general efficiencies of process. For example, the module may track variable data/marker usage, reel map trends and usages, printer data, print head usage, paper waste, etc., such as to help form insights to increase efficient manufacturing processes.

The customer insights module 152 may be configured to communicate with, for example, the variable data engine 135, the vision system module 145, and/or the reel manifest module 150.

The reel manifest module 150 may be configured to store and/or track the process flow (e.g., reel map) for the manufacturing process. The reel manifest module 150 works with the imposition engine module 130 to store the job layouts for operation during the manufacturing process 10. The reel manifest 150 may be checked, such as by the controller 90, to help determine the current position on a reel map—such as in response to receiving a detection (e.g., a marker or a defect) from the vision system module 145. Further, the corresponding information needed to operate the corrugator according to the reel map may be stored at the reel manifest module 150 and provided to the controller 90 so that the controller 90 may operate the corrugator accordingly. The reel manifest module 150 may work with the reel editor module 155 to edit the reel map in real time, such as described herein. The reel manifest module 150 may be configured to communicate with, for example, the customer insights module 152, the imposition engine module 130, the press module 140, the vision system module 145, the corrugator controls module 160, and/or the reel editor module 155.

The reel editor module 155 may be configured to enable editing of the process flow, such as the reel map. In this regard, in some embodiments, the reel editor module 155 interacts with the reel manifest module 150 to update the stored reel map. In some embodiments, the reel editor module 155 may work with the vision system module 145 to identify unnecessary waste, which can be edited from the reel map, such as based on instructions for the controller 90. Such example information can also be provided to the ERP/corrugator planning module 165 to update the reel map and/or for consideration in future jobs. The reel editor module 155 may be configured to communicate, for example, with the reel manifest module 150, the vision system module 145, and the ERP/corrugator planning module 165.

In some embodiments, a reel editor may be configured to edit the roll based on waste and/or errors that occurred during various manufacturing processes (e.g., during printing). For example, the controller 90 and/or reel editor module 155 may determine that some of the printed images are too poor quality and, thus, may edit the roll, such as by removing such corresponding structures with the poor quality images. Likewise, the roll of printed web product may be edited to remove the waste to form a more efficient roll. Accordingly, the reel map could be updated to account for the edits.

In some embodiments, the reel editor may be configured to determine if there is enough waste on the roll to even making editing worthwhile. For example, various factors may be checked to determine if there is enough waste or poor quality to warrant editing of the roll. In such a regard, certain rules and/or thresholds may be applied in order to determine whether or not to edit the roll. Such rules and/or thresholds may be effected by various factors, such as desired quality of the images, customer requirements, different price points, cost to edit the roll, board grade, among other possible factors.

In some embodiments, depending on the configuration, the reel editor may be integrated with various manufacturing components (e.g., the printer, a corrugator, etc.).

The corrugator controls module 160 may be configured to control operation of the corrugator, such as described herein. In some embodiments, the corrugator controls module 160 may work with one or more cameras/detectors to detect information (e.g., markers or defects) that can be used to control/adjust operation of the corrugator. For example, the cameras/detectors may detect a marker and the corrugator controls module 160 may determine how to operate the corrugator based on the detected marker (and/or the corresponding position of the reel map). Then, based on the determined desired operations, the corrugator controls module 160 may cause operation of the corrugator. For example, the corrugator controls module 160 may cause one or more knives to change position and/or perform a cut. Additional information regarding contemplated control through detection of markers is provided in greater detail herein. The corrugator controls module 160 may be configured to communicate with, for example, the reel manifest module 150, the vision system module 145, and the ERP/corrugator planning module 165.

In some embodiments, other components/machines and their corresponding controls may replace the corrugator, such as components/machines geared toward manufacturing of other products.

Example Structures and Orders for a Roll of Web Product

Figure 3A:
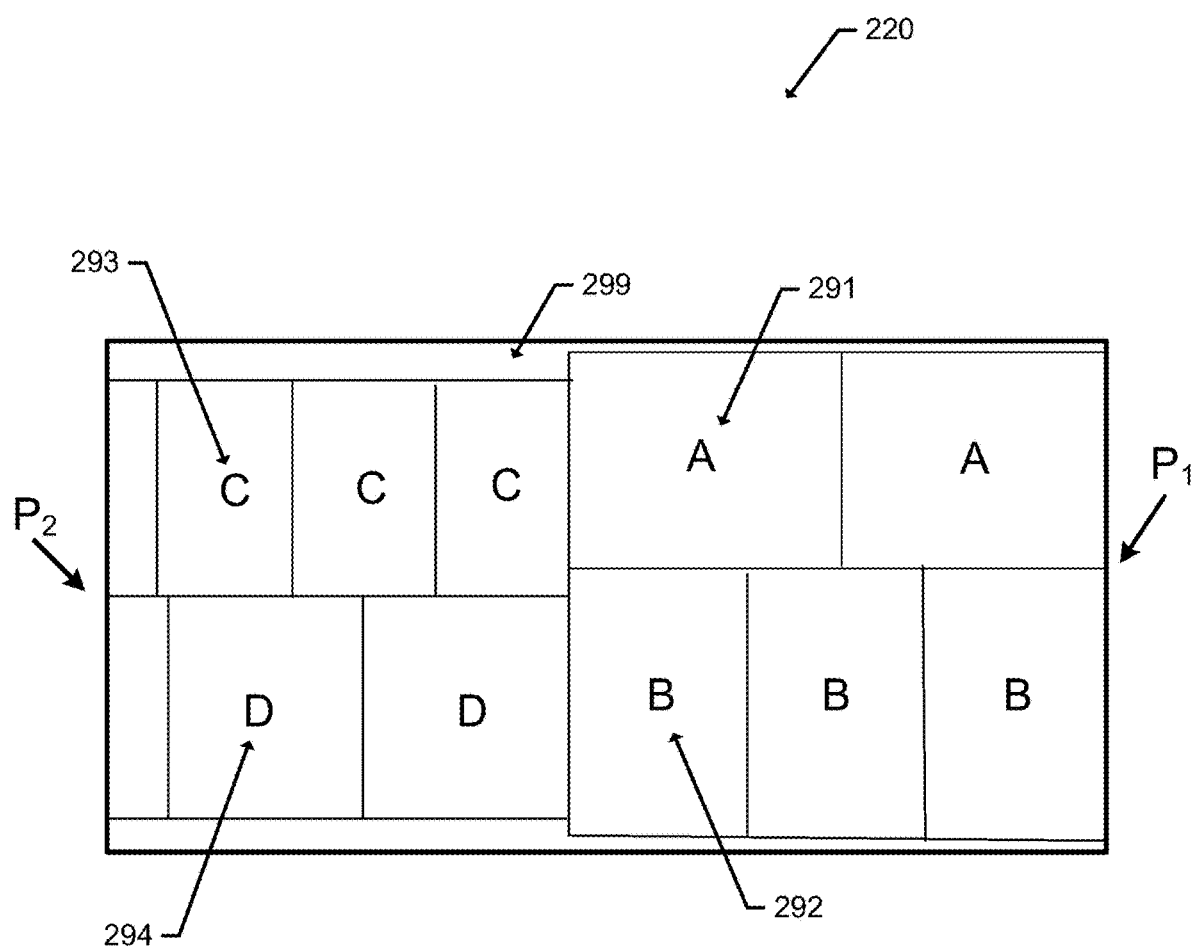
FIG. 3A shows an example portion of a roll of web product with four different structure areas, in accordance with some example embodiments discussed herein.

FIG. 3A shows an example arrangement of structures A, B, C, and D on a roll of web product 220, such as after the printing phase 30, and may, in some embodiments, form a representation of a control plan. Prior to printing, however, the roll of web product is blank such that there is no information thereon. In this regard, the controller 90 operates the various components of the printing phase 30 to form printed images and/or markers on the blank roll of web product to begin forming the desired structures. In the depicted example of FIG. 3A, the portion of the roll of web product 220 includes a number of first structures (A, 291), a number of second structures (B, 292), a number of third structures (C, 293), and a number of fourth structures (D, 294). The roll of web product 220 also includes some unused (scrap) sections 299 and potentially some waste between order changes down web, such as between structures A/B and structures C/D (though not shown in the example of FIG. 3A).

In some embodiments, the present invention contemplates use of a readable marker to enable efficient control and/or operation of various components of the manufacturing process 10. The present invention, in some embodiments, contemplates utilizing one or more markers on the roll of web product that is printed on the press and "read" to enable control of the various components of the manufacturing process 10. By "reading" the marker, the controller 90 can determine how to operate—such as by referring to a control plan associated with the roll of printed web product and determining the position along the control plan by virtue of the read marker. The marker can also be used in tracking the boxes for positioning in proper stacks and/or determining completion status of an order. The present invention contemplates many different types of markers (e.g., QR codes, bar codes, color marks, instructions themselves, etc.).

Figure 3B:
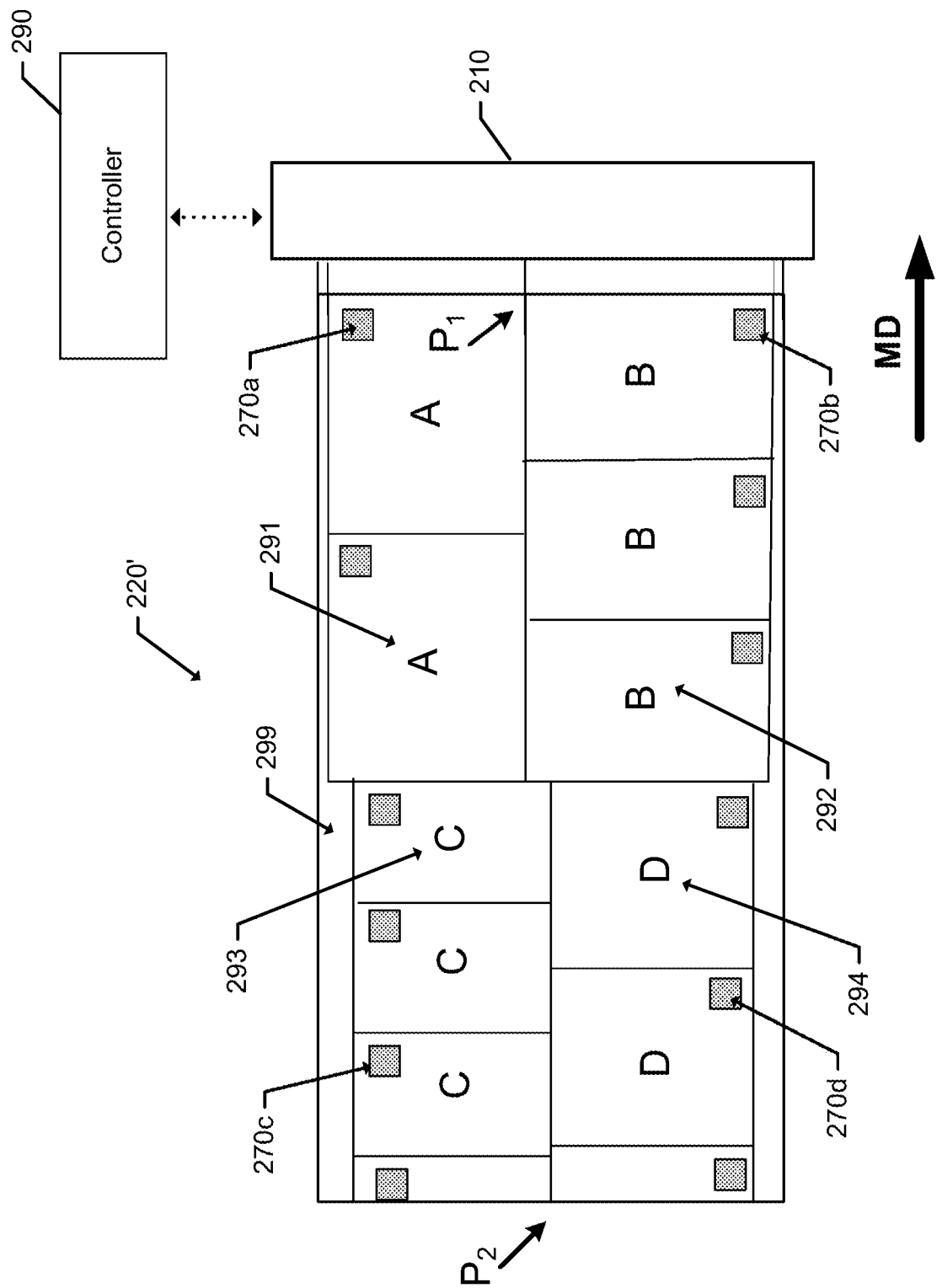
FIG. 3B shows an example portion of a roll of web product, wherein the structure areas each include a readable marker, in accordance with example embodiments described herein.

FIG. 3B illustrates an example portion of a roll of web product 220' that includes readable markers 270*a-d*. Notably, each structure includes a different readable marker. For example, structure A, 291 has a corresponding readable marker 270*a*; structure B, 292 has a corresponding readable marker 270*b*; structure C, 293 has a corresponding readable marker 270*c*; and structure D, 294 has a corresponding readable marker 270*d*. Though the depicted embodiment shows the readable marker positioned within a sheet or box structure, in some embodiments, the readable marker may be positioned in the margins or other waste area, but still associated with the corresponding structure (or order section with the one or more structures).

One or more detectors 210 may be positioned along the pathway through the various components operating for the roll of web product (e.g., a printer, a reel editor, a corrugator, finishing, etc.). In this regard, the one or more detectors 210 may be configured to "read" or detect the marker and provide that information to the controller 290 (e.g., controller 90). The controller 290 may then be configured to automatically control the various components of the manufacturing process 10 accordingly.

Depending on the desired configuration, some embodiments of the present invention contemplate different methods for obtaining information from the readable marker. For example, the readable marker may be a QR code and cause automatic gathering of instructions for how the corrugator should operate based on following a link or other redirection method provided by the QR code. Similarly, other readable markers may cause the controller 290 to use a look-up table or other correlation means to determine how to operate the corrugator. In some embodiments, the marker may include instructions in the marker itself. For example, position coordinates corresponding to a desired position for one or more knives of a corrugator may form part of the marker. In such embodiments, there is no need for a look-up table.

Example Reel Editor

Figure 4:
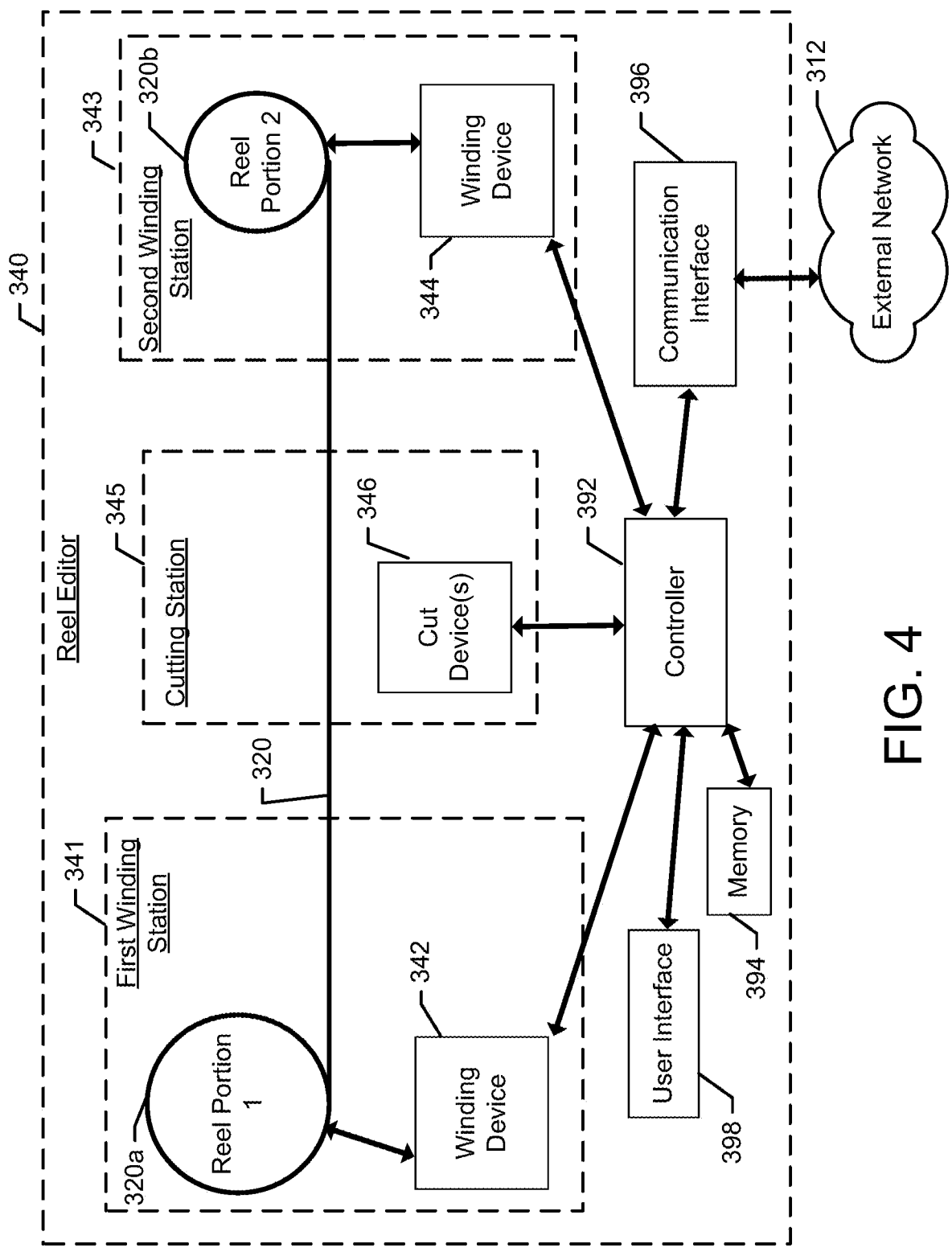
FIG. 4 shows a box diagram of an example reel editor, in accordance with example embodiments described herein.

With reference to FIG. 4, an example reel editor 340 for use in the example manufacturing process 10 may comprise hardware and/or software capable of performing one or more functions described herein. In this regard, the reel editor 340 may include a controller 392 (which may be embodied as or with controller 90 described herein), a memory 394, a communication interface 396, a user interface 398, a first winding station 341, a second winding station 343, and a cutting station 345.

The controller 392 may be any means configured to execute various programmed operations or instructions stored in a memory device such as a device or circuitry operating in accordance with software or otherwise embodied in hardware or a combination of hardware and software, thereby configuring the device or circuitry to perform the corresponding functions of the controller 392 as described herein. In this regard, the controller 392 may be configured to perform operations described herein, such as with respect to example reel editor modules described herein.

The memory 394 may be configured to store instructions, computer program code, reel map data, and other data/information associated with the reel editor 340 in a non-transitory computer readable medium for use, such as by the controller 392.

The communication interface 396 may be configured to enable connection to external systems (e.g., an external network 312, a computer server, and/or one or more other system(s)/device(s), such as from the manufacturing process 10). In some embodiments, the communication interface 396 may comprise one or more transmitters configured to transmit, for example, one or more signals according to example embodiments described herein. Likewise, the communication interface 396 may include at least one receiver configured to, for example, receive data according to example embodiments described herein. In some embodiments, the transmitter and receiver may be combined as a transceiver. In this regard, the communication interface 396 may be configured for wired and/or wireless communication. In some embodiments, the communication interface 396 may comprise wireless capabilities for WiFi, Bluetooth, or other wireless protocols.

The user interface 398 may be configured to receive input from a user and/or provide output to a user. The user interface 398 may include, for example, a display, a keyboard, keypad, function keys, mouse, scrolling device, input/output ports, touch screen, or any other mechanism by which a user may interface with the system. Although the user interface 398 is shown as being directly connected to the controller 392 and within the reel editor 340, the user interface 398 could alternatively be remote from the controller 392 and/or reel editor 340. Likewise, in some embodiments, other components of the reel editor 340 could be remotely located.

The first winding station 341 of the reel editor 340 is configured to receive a roll of printed web product (e.g., reel portion 1, 320a). In some embodiments, the first winding station 341 may comprise one or more winding devices 342 that are configured to cause an installed roll of printed web product to unwind or wind (depending on the direction of operation).

The second winding station 343 of the reel editor 340 is configured to receive a tail end of the roll of printed web product and enable gathering (e.g., winding) of the printed web product roll as the roll is unwound from the first winding station 341. For example, as the roll of printed web product 320 is processed through the reel editor 340, the tail end may attach to and begin the reel portion 2, 320b. In some embodiments, the second winding station 343 may include one or more winding devices 344 that are configured to cause an installed roll of printed web product to unwind or wind (depending on the direction of operation).

The cutting station 345 is configured to enable one or more portions of the roll of printed web product to be edited (e.g., removed). In this regard, depending on the configuration of the reel editor 340, the cutting station 345 may be designed for manual interaction from an operator (e.g., to perform the cutting) or automatic control of the cutting, or some combination of both.

In some embodiments, the cutting station 345 may include one or more cut devices 346 that are configured to be utilized (e.g., manually or under control of the controller 392) to cut one or more portions of the roll of printed web product 320.

In some embodiments, the cutting station 345 may be configured to enable cutting of the roll of printed web product in the width direction. In such a regard, a portion of the roll of printed web product 320 may be removed such as between two cuts along the width direction. In some embodiments, the remaining portions of the roll of web product 320 may be connected back together to re-form the roll of printed web product (albeit with a portion removed). In some embodiments, each portion of the roll of printed web product may be used to form two "child" rolls of printed web product. In some embodiments, such cuts along the width of the roll of printed web product may be used to remove waste between order sections on the roll of printed web product.

In some embodiments, the cutting station 345 may be configured to enable cutting of the roll of printed web product in the length direction (e.g., slitting). In some such embodiments, a portion of the roll of printed web product 320 may be removed.

In some embodiments, slitting (e.g., at a slitting section) may be used to reduce the width of the roll of printed web product to a desired width such as to match a planned (e.g., scheduled) component of the manufacturing process. For example, if there are multiple lanes of orders on the roll of printed web product, one or more lanes (e.g., from the control plan/reel plan) could be removed to enable processing through other downstream equipment. For example, the printing press may be able to print on a width of 12 feet, but a downstream component may only be able to handle a width of 6 feet. In such embodiments, the slitter could be used to form one or more "child" rolls of printed web product. In some embodiments, the control plan could be updated by generation of individual control plans for each child roll that was formed.

Figure 5A:
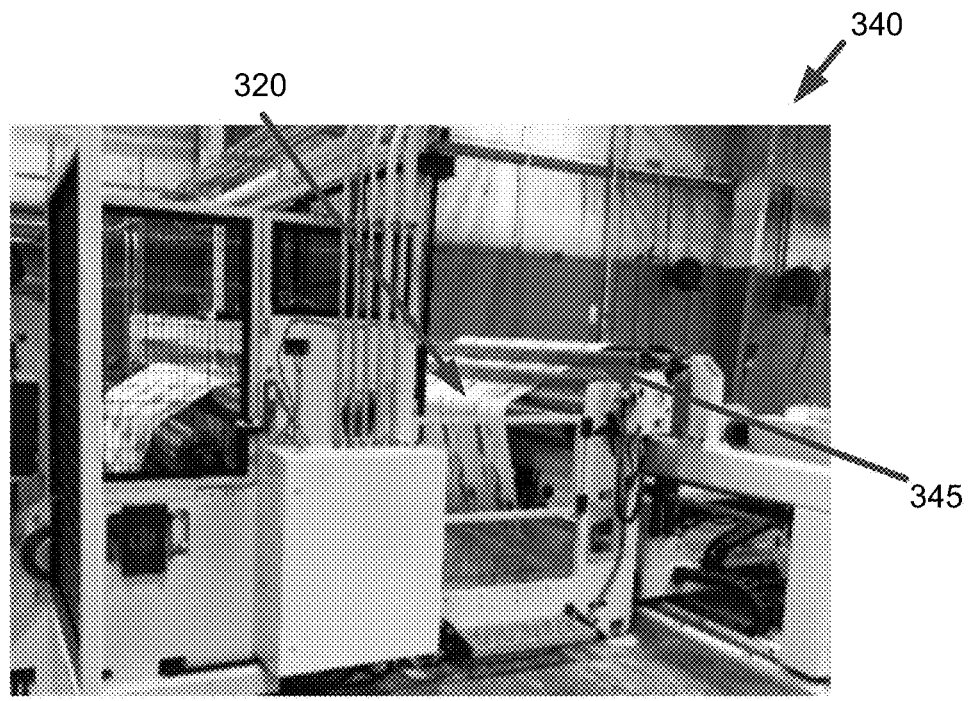
FIG. 5A shows an example reel editor with a cutting station, in accordance with example embodiments described herein.
Figure 5B:
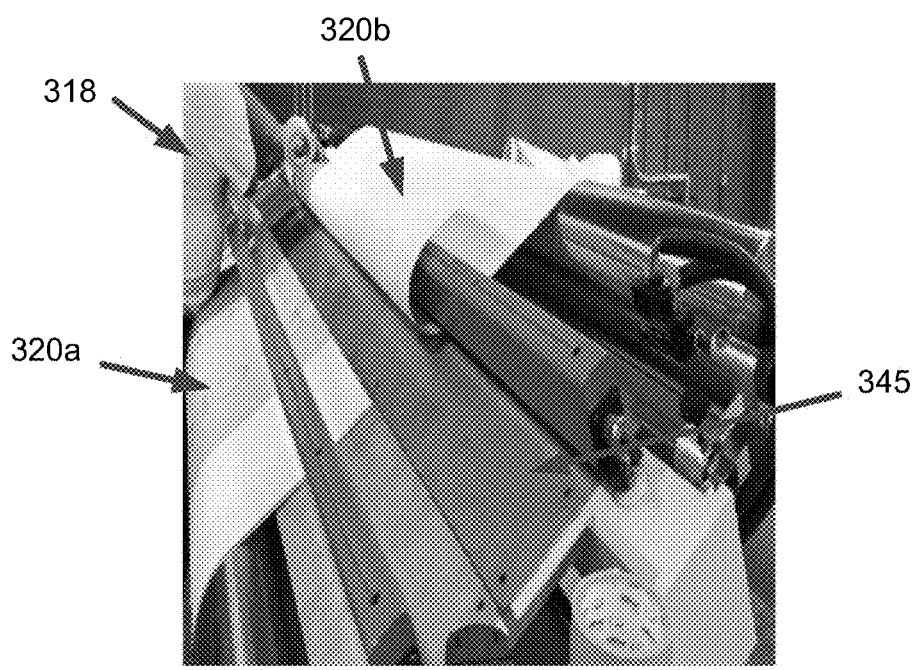
FIG. 5B shows a close up of an example cutting station, with an operator performing a cut of the roll of web product, in accordance with example embodiments described herein.

FIG. 5A shows an example reel editor 340 with a cutting station 345. A roll of printed web product 320 is being processed by the reel editor 340. FIG. 5B shows a close up of an example cutting station 345. An operator 318 is performing a cut along a width of the roll of web product, thereby forming a first portion of the roll of printed web product 320a and a second portion of the roll of printed web product 320b.

In some embodiments, the reel editor 340, such as through the controller 392, is configured to edit a roll of printed web product and update a corresponding reel map to account for the editing. In this regard, updating the reel map enables efficient use of the reel map in downstream portions of the manufacturing process. In some embodiments, the controller 392 is configured to operate a reel editor module to perform example functions accordingly.

In some embodiments, the reel editor module is configured to receive a reel map associated with the roll of printed web product, wherein each roll of printed web product is associated with a unique reel map. For example, the reel editor module may gather the reel map from the controller 90 of the manufacturing process 10 (and/or from various modules of the manufacturing process 10). As an example, the roll of printed web product may have recently undergone a check from the vision system module (such as looking for waste or defects). In some embodiments, the reel editor module may be configured to receive the reel map from the vision system module.

The reel map, such as described herein, may comprise roll data that includes data corresponding to one or more printed orders on the roll of printed web product. The roll data may comprise waste data that includes one or more locations of waste sections on the roll of printed web product. In such example embodiments, each of the waste sections may correspond to at least one of waste on the roll of printed web product or unsatisfactory images that are printed on the roll of printed web product. Accordingly, the reel map may be updated, such as from the vision system module, with indications of such waste or defects.

The reel editor module may also be configured to control the first winding device to unwind the roll of printed web product to position locations of waste at the cutting station for corresponding editing. For example, the controller 392 may cause the roll of printed web product 320 to be unwound to a position on the cutting station 345 so that an operator may cut out the waste. Likewise, such cutting and/or removal could be performed automatically, such as under control of the controller 392.

The reel editor module may also be configured to control at least one of the first winding device of the first winding station or a second winding device of the second winding station to wind the edited roll of printed web product after removal of the waste section. For example, the reel editor module may be configured to wind up the edited portion of the roll of printed web product (e.g., form reel portion 2 320b in FIG. 4).

In some embodiments, the reel editor module may be configured to update the reel map associated with the roll of printed web product by updating the roll data based on the removed waste sections to form an updated reel map associated with the edited roll of printed web product. For example, the reel editor module may be configured to update the overall length of the printed web product on the edited roll. As another example, the reel editor module may be configured to update the reel map with the revised length for each order section and/or the revised number of remaining structures in each order section. In some embodiments, such as during creation of one or more "child" rolls, the reel editor module may be configured to develop/form corresponding reel maps for the "child" rolls.

In some embodiments, the reel editor module may be configured to control at least one of the first winding devices 342 or the second winding devices 344 to rewind the now edited roll of printed web product. In this regard, when the roll of printed web product is first unwound to accomplish editing, the direction of the winding when at the second winding station 343 (e.g., reel portion 2) is backwards. Thus, the reel editor module may rewind the roll of printed web product, such as back to the first winding station 341, to put the order of winding back in the proper direction.

In some embodiments, the reel editor module may be configured to count, detect, and/or process the roll of printed web product as it is rewound. Depending on the configuration of the roll of printed web product and/or components of the reel editor, various detection techniques could be used. For example, markings may be read to enable such detection. Additionally or alternatively, overall length could be determined, such as by knowing the speed of rotation of the winding device(s) and the time of operation to complete the rewind. These are just some examples of how to determine characteristics regarding the roll of printed web product, as others are contemplated by various embodiments of the present invention. In this regard, various specifics regarding the now edited roll of printed web product can be determined. For example, the overall length of the roll, various order sizes, etc., may be determined. This enables accurate updating of the reel map, as unknown editing may occur at the reel editor (e.g., an operator may visually and manually determine extra waste to remove—such as above and beyond the indicated waste on the reel map prior to editing).

In some embodiments, the reel editor module is configured to provide the updated reel map to one or more modules of the manufacturing process 10 (e.g., a corrugator for further processing of the now edited roll of printed web product).

In some embodiments, the reel editor module is configured to cause one or more labels for the edited roll of printed web product to be printed and/or applied to the edited roll of printed web product. The label may include, for example, identification of the edited roll of printed web product. Additionally, the label may indicate one or more characteristics about the edited roll, such as the new overall web length, the web width, orders information, among many other things.

As noted above, the reel editor may be a separate component of the manufacturing process 10. Alternatively, some or all of the reel editor may be incorporated into at least some components of the manufacturing process 10. For example, the reel editor may be a part of the printing press and/or the component for product processing/formation. In either case, there may, in some situations, be extra waste created by editing the roll at the printing press or other components. For example, editing a roll of printed web product at a corrugator may result in excess waste due to running the corrugator while editing occurs. In this regard, as described in greater detail herein, the corrugator uses multiple rolls of web product to form a finished layered corrugated board web. If the top liner is being edited, then the other rolls may be running needlessly, creating unnecessary waste (and cost).

In some embodiments, the reel editor module (or another module/controller of the manufacturing process 10) may be configured to determine whether or not to edit waste from a roll of printed web product. In this regard, there may be one or more reasons to not edit a roll of printed web product even if there is some waste on the roll. For example, it may be important to finish one or more orders on the roll within a certain time period (e.g., the order is due), and the operator (and/or reel editor module) may determine that the extra time spent removing the waste is not worthwhile. Along similar lines, the cost of running the reel editor to edit the roll may be greater than the cost of processing the roll of printed web product with the defects/waste. Further, such determinations may vary depending on many factors, such as desired quality of the images, customer requirements, different price points, among other possible factors.

In this regard, in some embodiments, the reel editor module may be configured to receive, such as from a vision system module of a manufacturing process, a reel map associated with the roll of printed web product. As noted herein, each roll of printed web product is associated with a unique reel map. The reel map may comprise roll data that includes order data and waste data. The waste data may indicate one or more waste sections on the roll of printed web product, wherein each of the one or more waste sections corresponds to at least one of waste on the roll of printed web product or unsatisfactory images that are printed on the roll of printed web product. The order data may correspond to one or more printed orders on the roll of printed web product and include at least one of cost associated with processing material for the order, customer data associated with the roll of printed web product, desired quality data associated with the roll of printed web product, or pricing data associated with the roll of printed web product.

In some embodiments, the reel editor module may be configured to utilize data from the reel map to determine an amount of waste on the roll of printed web product. For example, the reel editor module may utilize the waste data from the reel map to determine an overall length reduction in the roll if the roll was edited—e.g., corresponding to the amount of waste on the roll. Additionally or alternatively, the amount of waste may be determined based on a number of factors, such as each order section, on certain (e.g., important) order sections, only defected images, etc.

In some embodiments, the reel editor module may be configured to determine a waste tolerance threshold for the roll of printed web product. For example, the reel editor module may take into account a number of factors to form a waste tolerance threshold, such as the cost of running various components of the manufacturing process, the cost of materials of the manufacturing process, customer preferences, desired quality data associated with the roll of printed web product, or pricing data associated with the roll of printed web product. Based on these or other factors and possible weights associated with the factors, a waste threshold may be determined.

In some embodiments, the reel editor module may be configured to determine if the determined amount of waste satisfies the waste tolerance threshold. In an instance in which it does satisfy the waste tolerance threshold, then the reel editor module (or other module/controller in the manufacturing process 10) may determine not to edit the roll of printed web product. In an instance in which it does not satisfy the waste tolerance threshold, then the reel editor module may determine the need to edit the roll of printed web product.

In response, the reel editor module may be configured to provide an indication or instruction according to its determination. For example, the reel editor module may provide a message, notification, or other indication to an operator to indicate whether or not the roll of printed web product should be edited. In some embodiments, the reel editor module may cause the roll of printed web product to be sent to and/or processed by the corresponding component based on its determination (e.g., sent to the reel editor or sent to the corrugator).

In some embodiments, the determination of whether the amount of waste satisfies the waste tolerance threshold may be based on certain rules. For example, the comparison may be made at each order section. In such an example embodiment, the reel editor module may make the determination at various levels. For example, in some embodiments, all of the order sections may have to satisfy the waste tolerance threshold to not have the roll edited. In another example, the order sections may be weighted due to various factors (such as described above) and only certain order sections may need to satisfy the waste tolerance threshold in order for the roll to not be edited. Similarly, in some embodiments, only a certain number of order sections may need to satisfy the waste tolerance threshold in order for the roll not be edited.

In some embodiments, the reel editor module may determine the cost associated with running the reel editor to remove the determined amount of waste. For example, the reel editor module may factor in labor costs associated with running the reel editor to remove the waste.

In some embodiments, the reel editor module may determine the cost associated with running the processing/formation component (e.g., a corrugator) with the waste. For example, there may be costs associated with extra material being run through the corrugator. Additionally, there may be labor costs associated with dealing with the waste during or after use of the corrugator.

In some such embodiments, the reel editor module may be configured to compare the determined costs associated with running the reel editor vs. the cost associated with running the processing/formation component with the waste and determine which cost is less. Then, based on which will cost less, the reel editor module may determine whether or not the roll of printed web product should be edited (such as by determining that it should be edited if the cost of running the reel editor is less than running the corrugator with the waste). Such embodiments may be used instead of the waste threshold test and/or in conjunction with the waste threshold test. For example, the cost comparison could be part of the determination of the waste tolerance threshold (as there may be a tipping point when the amount of waste may cause the cost comparison to move from a determination of no need to edit the roll to a determination of a need to edit the roll).

In some embodiments, one or more of the determinations by the reel editor module may be sent to the customer insights database to provide updated information that may be useful for the customer and/or manufacturer.

Example Corrugated Box Manufacturing Process

Corrugated sheet and box manufacturing is an example paper, sheet, and/or box manufacturing system. In some such manufacturing, a corrugator is used to glue together layers of board web with a flute medium positioned in between. Depending on the desired characteristics of the corrugate board web, different layers/arrangements can be combined. Once formed, the corrugate board web (e.g., top layer, flute medium, and bottom layer) may then be cut into appropriate sheet or box structures, and later scored, cut, glued etc. to form the broken down box (that is then folded and manipulated to form the box, such as by the customer). Although the following description provides detailed examples of "corrugators", some example embodiments of the present invention contemplate the term "corrugator" to mean a board-making device, such as a high speed laminator.

Figure 6A:
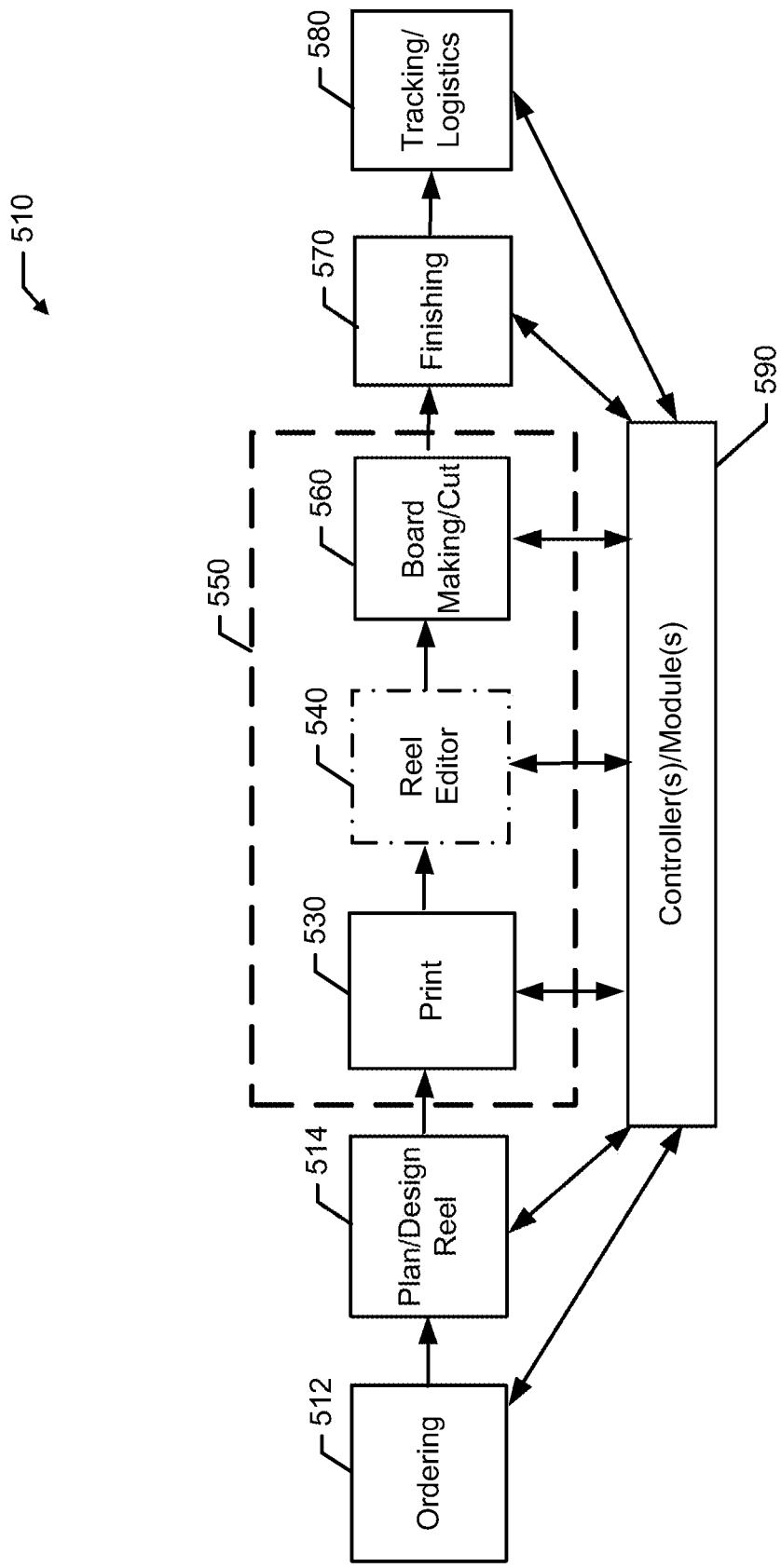
FIG. 6A shows a block diagram of an example corrugated sheet or box manufacturing process with print in-line with the corrugator, in accordance with some embodiments discussed herein.

FIG. 6A illustrates an example corrugated box manufacturing process 510 according to various embodiments of the present invention. The manufacturing process 510 includes a number of phases that result in a finished corrugated sheet or box that is shaped and printed per the customer's order. The process 510 may include an ordering phase 512, a planning phase 514, a print phase 530, a reel editor phase 540, a board making/cutting phase 560 (e.g., a sheet formation/processing phase), a finishing phase 570, and a tracking/logistics phase 580. In some embodiments, less or more phases or different orders of phases are contemplated. Additionally, while the described example is detailed for corrugated box making, some embodiments of the present invention are contemplated for extension into other product manufacturing, including printed paper-based product manufacturing, such as folded carton, beverage labels, flexible paper, industrial bags, plates, cups, décor, and many others.

In the ordering phase 512, a customer may supply an order that includes desired characteristics for the end product. For example, the customer may provide a number of desired sheet or box structures, sheet or box shape requirements, one or more images/designs for printing on the sheet or box, color specifications, among many others. In some embodiments, the customer 512 may input such an order through a web interface. The web interface may enable the customer 512 to easily input the desired characteristics of the order electronically. The web interface may also enable the customer to perform many related tasks, including, for example, updating orders, tracking orders, handling payment, requesting assistance, setting up automated ordering (e.g., recurring ordering), viewing and approving example images ("soft proofing"), viewing example end products, etc.

In addition to providing increased efficiency of process for the customer, the web interface may also directly interact with and provide information for automated processes useful in the remainder of the manufacturing process 510. For example, the information from the web interface may be fed directly into a corrugator plan controller (such as the controller 590) and utilized accordingly. For example, as described herein, the information from the web interface may be used to form a corrugator plan and/or associated reel map or print plan of the corrugated sheet or box structure making process. Additionally, however, the information from the web interface may be used to provide on-the-fly updates or adjustments to the manufacturing process. Further, feedback (e.g., from the controller 590) may be provided back to the web interface for the customer, such as tracking information, images of the completed sheet or box structures, among other things.

In some embodiments, a controller 590 may be configured to perform various functionality useful in the manufacturing process 510 (e.g., the various modules/phases described herein). For example, the controller 590 (such as during the planning phase 514) may be configured to form a corrugator plan (which may be included in an associated reel map), such as may be used in conjunction with the corrugator 550 (e.g., during the board making phase/cutting phase 560). As used herein, in some embodiments, an associated reel map may be an example of a corrugator plan. In this regard, other example corrugator plans (e.g., a print plan) can be used, formed, etc. Additionally or alternatively, the controller 590 may be configured to form a print plan that is used in the printing phase 530 (such as described herein). Likewise, the controller 590 may be used with the ordering phase 512, such as to receive order information, the finishing phase 570, and/or the tracking/logistics phase 580. An example controller 590 is described further herein as controller 690 (which is shown and described with respect to FIGS. 7A and 7B). In some embodiments, the controller 590 may be spread over any number of controllers at any of the various phases of the manufacturing process 510.

In some embodiments, sections of the process flow can be shifted from plant to plant or device to device due to various external circumstances. For example, repair of certain parts of the corrugator, replacing certain printer inks, etc., may cause only certain customer sheet or box structures to be able to be manufactured. In this regard, in some embodiments, certain portions of the process flow may be shifted, such as being jumped in line, moved to another facility, etc., in order to maintain efficient up time of operation of the printer(s) and corrugator(s).

Figure 6B:
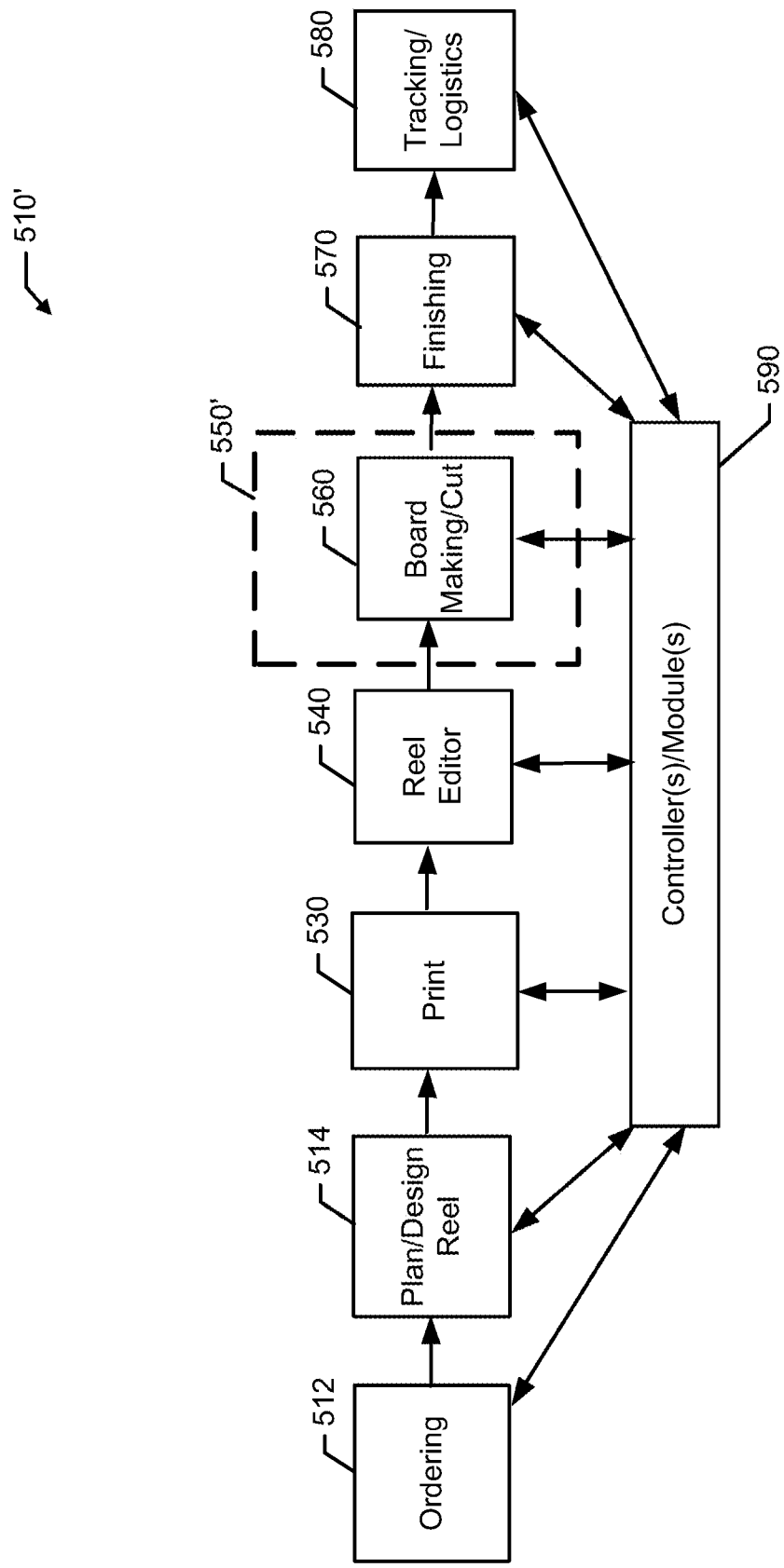
FIG. 6B shows a block diagram of an example corrugated sheet or box manufacturing process with print off-line or near-line, before the corrugator, in accordance with some embodiments discussed herein.
Figure 7A:
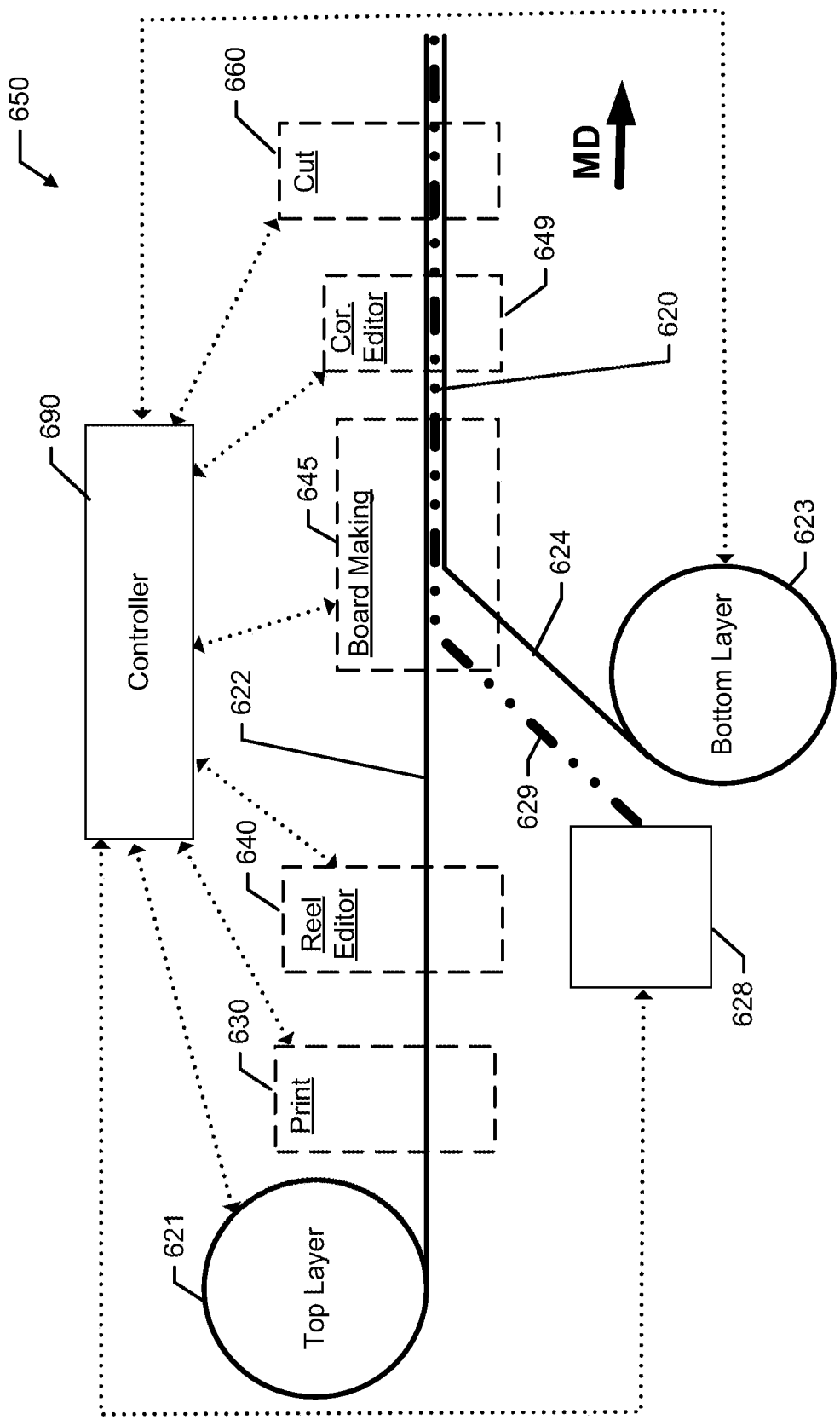
FIG. 7A illustrates a portion of the corrugated box manufacturing process with print in-line with the corrugator, in accordance with some embodiments discussed herein.
Figure 7B:
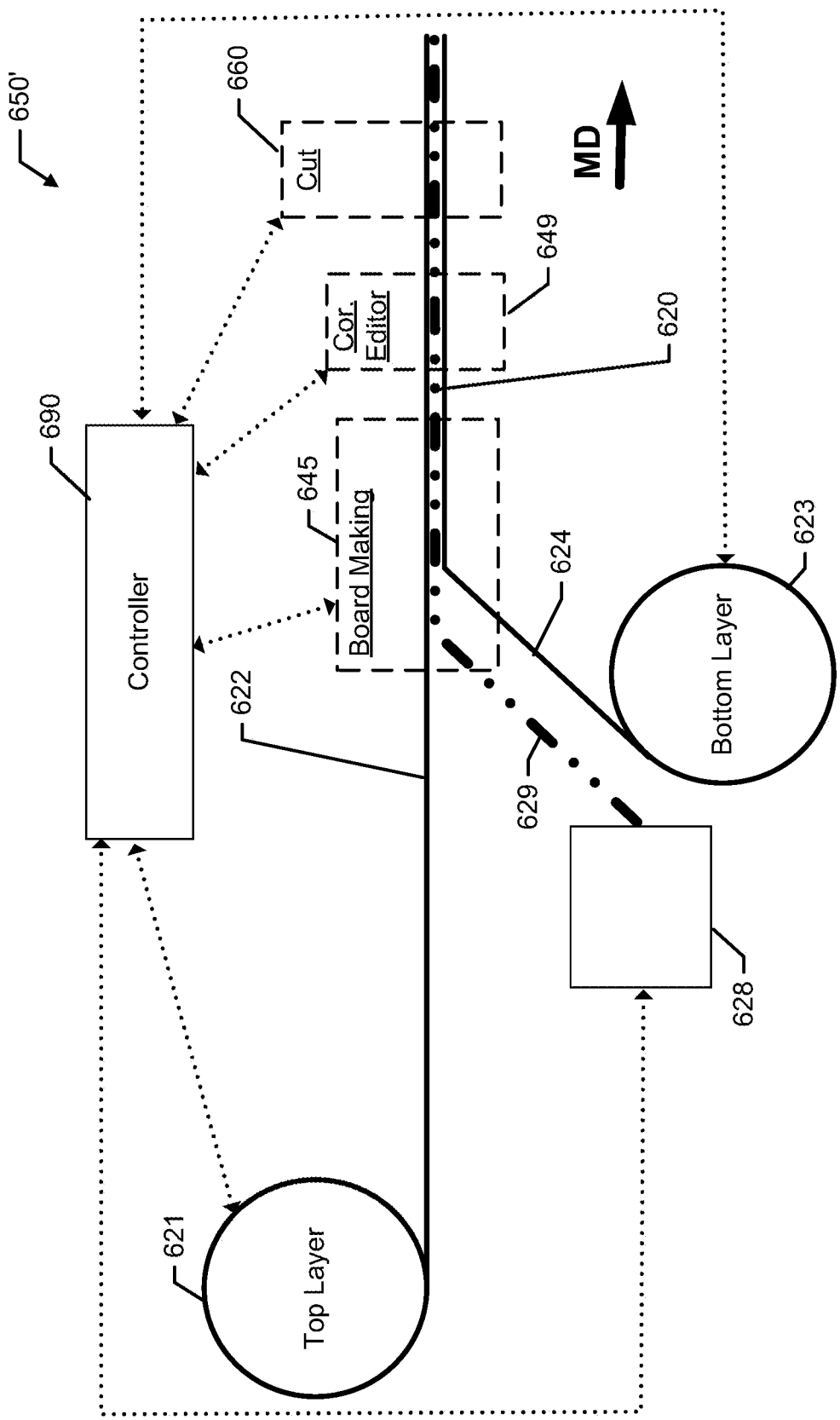
FIG. 7B illustrates a portion of the corrugated box manufacturing process with print off-line or near-line, before the corrugator, in accordance with some embodiments discussed herein.

The manufacturing process 510 may also include the printing phase 530, reel editor phase 540, and board making/cutting phase 560. In some embodiments, the printing phase 530, reel editor phase 540, and board making/cutting phase 560 may be performed using a corrugator 550 (such as shown in FIG. 6A) or other manufacturing system. Alternatively, in some embodiments the printing phase 530 and/or reel editor phase 540 may be performed separately, prior to the corrugator 550' (such as shown in the manufacturing process 510' shown in FIG. 6B). Similarly, FIG. 6A also illustrates that the real editor phase 540 may be optional within a corrugator 550 that also employs a printing phase 530. FIG. 7A illustrates an example corrugator 650 that incorporates the printing phase 530, the reel editor phase 540, and the board making/cutting phase 560 to form an in-line process. In some embodiments, the reel editor phase 640 may not be included in the example corrugator 650 of FIG. 7A. FIG. 7B illustrates an example corrugator 650' with the printing phase 530 and the reel editor phase 540 occurring separately, prior to the board making/cutting phase 560. This approach is sometimes referred to as a near-line process.

With reference to FIG. 7A, the corrugator 650 may, such as through controller 690, cause conveyance of one or more paper web, printed web, corrugated board web, and/or flute medium through the machine (and various phases), such as along the machine direction (MD) arrow. For example, one or more conveyor means (e.g., a conveyor belt) and/or motors may be used to cause a top layer 622 of paper web to pass through a printing phase 630 and, optionally, a reel editor phase 640. The top layer 622 of paper web may be held in a roll 621 (or other form), such as may be referred to herein as a roll of web product. The corrugator 650 may also control introduction of one or more flute mediums 629 and/or other layers to form the corrugated board web (such as the roll 623 of the bottom layer 624 of corrugated board web).

As described herein, in some embodiments, a reel map (e.g., a corrugator/control plan) may be used to help maintain efficient operation of the corrugator and avoid waste during making of the sheet or box structures. In this regard, a certain arrangement of sheet or box structures may need to be followed through the corrugator 650. Such operation and tracking may occur, such as through use of the controller 690.

As described in more detail herein, the controller 690 provides logic and control functionality used during operation of the corrugator 650 and, in some embodiments, the entire manufacturing process 510. In some embodiments, the functionality of the controller 690 may be distributed to several controllers that each provides more limited functionality to discrete portions of the operation of manufacturing process 510. In this regard, the controller 690 may have the same or similar suitable hardware or software to the controller 90 described herein.

The controller 690 may be operably coupled with one or more components of the manufacturing process 510, including for example, the roll 621 of the top layer 622 of corrugated board web, a medium holder (e.g., roll) 628 of medium 629, the roll 623 of the bottom layer 624 of corrugated board web, various components of the printing phase 630, various components of the reel editor phase 640, various components of the boarding making phase 645, various components of the cutting phase 660, conveyance means of the corrugator, various components of phases for the manufacturing process, and other components (such as described herein). For example, depending on the components, the controller 690 may be operably coupled such as through use of solid-core wiring, twisted pair wiring, coaxial cable, fiber optic cable, mechanical, wireless, radio, infrared, etc. In this regard, depending on the components, the operable coupling may be through one or more intermediate controllers or mechanical coupling, such as used for controlling some components (e.g., controlling operation and/or feeding of the roll 621 of the corrugated board web). In some embodiments, the controller 690 may be configured to provide one or more operating signals to these components and to receive data from these components.

As noted above, the controller 690 (e.g., the corrugator plan controller) may be split into more than one controller, such as multiple controllers that exchange information, data, instructions, etc. For example, the controller 690 may be split into a corrugator planning software controller, a corrugator machine user interface controller, a corrugator system controls, press 630 operations and graphics workflow software and/or specific functional controls (e.g., a separate vision system such as described herein).

In some embodiments, such as described in greater detail herein, the controller 690 may be operably coupled to one or more vision systems, such as for detecting markers and/or defects/errors during the manufacturing process. Depending on the feedback from the vision systems, the controller 690 may control the corrugator 650 and/or manufacturing process 510 accordingly.

Depending on the configuration of the corrugator, the printing phase 630 may occur prior to combining the layers of corrugated board web 621, 623 and flute medium 628 (e.g., "pre-print") or after combining two or more layers (e.g., "post-print"). In some embodiments, printing may occur to other layers (e.g., the bottom layer 623), such as in alternative to or in addition to the top layer 621.

During the printing phase 630, the controller 690 may direct the press digital front end (DFE) and raster image processor (RIP), etc., to print one or more images at specific locations on the top layer 622 of the paper web. Depending on the configuration of the corrugator 650 and/or manufacturing process 510, the controller 690 may utilize a process flow (e.g., reel map) to determine where on the paper web to print the images and/or markers. For example, an image selected by the customer (such as a bottle), may be printed in the center (or other section) of a sheet or box structure—such as may ultimately be visible for marketing or other purposes once the box is formed. Any image (including, words, markers, instructions, etc.) are contemplated by various embodiments of the present invention. Example markers that can be printed, include any marker that may be used by various components of the manufacturing process 510, such as for tracking, cutting, printing, etc. Further description regarding possible markers and their utilization is provided in greater detail herein. In this regard, the controller 690 may be connected to one or more vision systems that are used to read or detect color, defects, and various markers for controlling and/or updating operation of the corrugator 650.

During the reel editor phase 640, the controller 690 may be configured to perform functions described herein related to editing or determining whether to edit the printed top layer of board web. Although shown in-line, in some example embodiments, the reel editor 640 may be out of line or near-line such that the roll of web product may be transferred to the reel editor 640 for processing. In some embodiments, the corrugator may have one or more functions/features that enable editing of the roll of web product (such as removing waste). In some such example embodiments, the reel editor 640 may form part of the corrugator.

During the board making phase 645, the controller 690 may be configured to cause combining of one or more layers and/or flute medium to form the corrugated board web for the boxes. For example, the controller 690 may be configured to cause fluted medium 629 to be fed into contact with one or more layers of corrugated board web, such as between a top layer 622 (such as from the roll 621) and a bottom layer 624 (such as from the roll 623). In this regard, in some embodiments, the fluted medium 629 may be fed into contact with the top layer 622 prior to the combined fluted medium 629 and top layer 622 coming into contact with the bottom layer 624. The controller 690 may cause formation of the combined layers into a layered corrugated board web 620, such as through use of glue or other adhesive.

During a corrugator editing phase 649, the controller 690 may be configured to edit the corrugated board web, such as by chopping out waste or undesirable corrugated board web. Such waste can be removed from the corrugator 650.

During the cutting phase 660, the controller 690 may be configured to cut out the sheet or box structures. In this regard, the controller 690 may be operably coupled to the various knives to control operation during the cutting phase 660. In some embodiments, the controller 690 may be configured to utilize the process flow (e.g., reel map) to determine how to operate the various knives (e.g., move the knives, cause a cut to occur, etc.).

Figure 8:
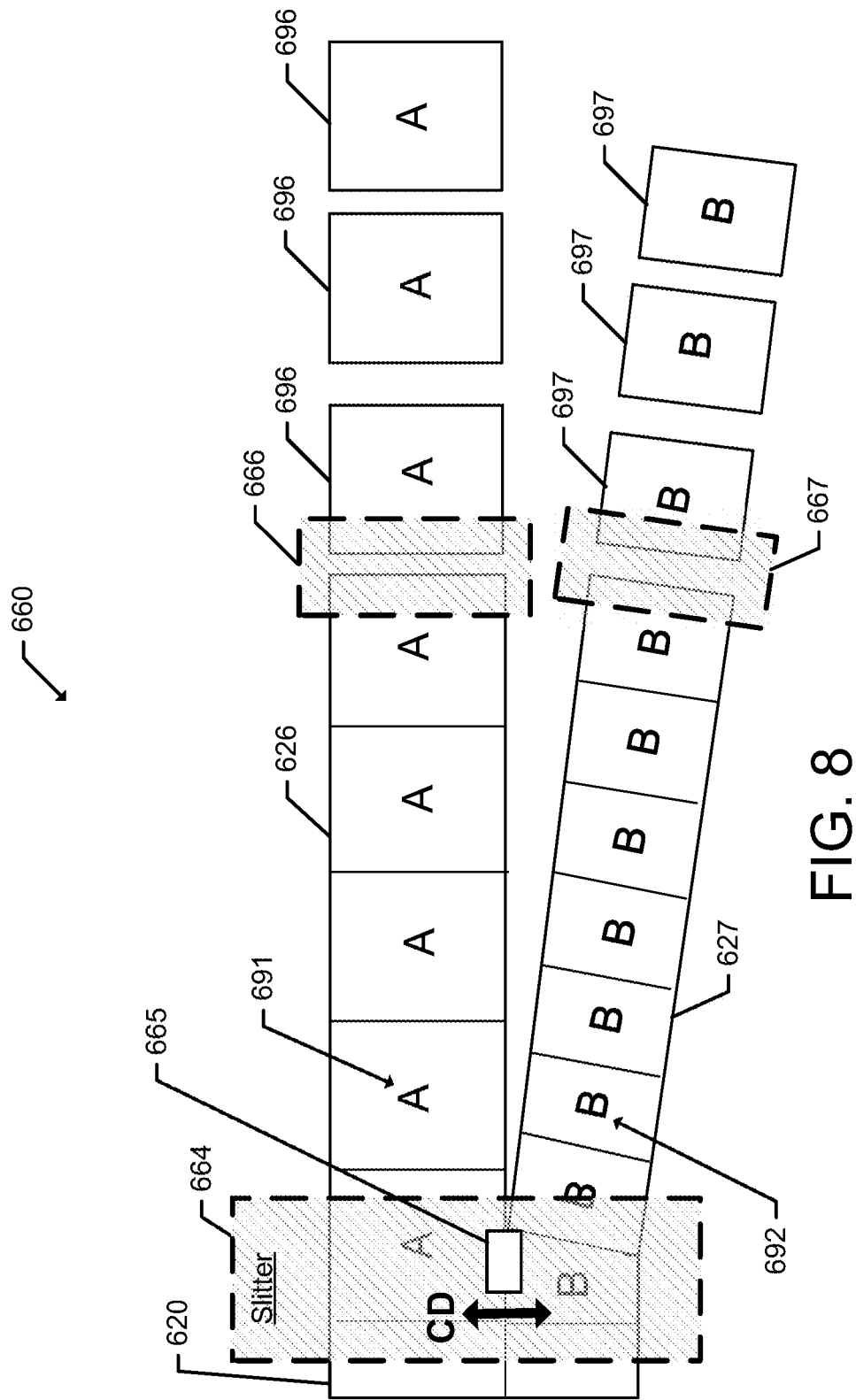
FIG. 8 illustrates a cutting arrangement portion of the corrugated box manufacturing process, in accordance with some embodiments discussed herein.

FIG. 8 shows an example cutting phase 660 that includes a knife (e.g., slitter 664) that is configured to cut the layered corrugated board web 620 in the longitudinal (or machine) direction. The cutting phase 660 also includes two knives 666, 667 that are each configured to cut the layered corrugated board web 620 in the lateral direction or cross direction CD. As described herein, the controller 690 may be operably coupled to the various knives to control operation thereof. In some embodiments, the controller 690 may be configured to utilize the process flow (e.g., reel map) to determine how to operate the various knives (e.g., move the knives, cause a cut to occur, etc.).

As the layered corrugated board web 620 passes through the cutting phase, a slitter 664 may be configured to split the layered corrugated board web 620 to cause it to split into different sections that travel on different paths (such as the top section 626 that travels along the top path and the bottom section 627 that travels along the bottom path). In some embodiments, a first sheet or box structure may form the top section 626 and a second sheet or box structure may form the bottom section 627—thereby creating two different paths that separate the two types of sheet or box structures (e.g., sheet or box structure A, 691 is formed in the top section 626 and sheet or box structure B, 692 is formed in the bottom section 627). The location 665 in which the slitter 664 performs the cut is important because sheet or box structures may vary as the layered corrugated board web 620 travels through the corrugator. For example, FIG. 3A shows that a slitter would need to cut at a first position $P_1$ to cause separation of the sheet or box structures A, 691 from the sheet or box structures B, 692. However, the slitter would need move at the right time (e.g., the transition from the sheet or box structures A, B to the sheet or box structures C, D) or a second slitter may be used to cut instead at the second position $P_2$ to cause separation of the sheet or box structures C, 693 from the sheet or box structures D, 694. Referring back to FIG. 8, the slitter 664 may be movable (such as based on instruction from the controller 690) in the cross direction CD in order to cut the layered corrugated board web 620 at the proper position.

Once separated into different paths, the various sections of layered corrugated board web 626, 627 may pass through respective knives 666, 667. In some embodiments, the knives 666, 667 may be configured (such as based on instruction from the controller 690) to cut the sheet or box structures in the lateral (cross) direction in order to form the desired sheet or box structures. For example, knife 666 cut the top section 626 to form the sheet or box structures A, 696. Likewise, knife 667 cut the bottom section 627 to form the sheet or box structures B, 697.

In some embodiments, other knives may be utilized for cuts, such as side slitters for cutting scrap along the edges. Likewise, other components may be utilized, such as scorers for pre-creasing sheet or box structures. Such other knives and/or components may be formed as part of the above described systems.

Referring back to FIG. 6A, with the sheet or box structures cut, the manufacturing process 510 may continue to the finishing phase 570. The finishing phase 570 may include additional printing, additional cutting, additional gluing, and/or other necessary functions to achieve a finished sheet or box structure for sending to the customer. In some embodiments, a vision system or other visual inspection system may be used to confirm accuracy of the order.

The manufacturing process 510 may also include a tracking/logistics phase 580 that includes tracking the finished sheet or box structures and preparing/delivering them to the customer. In some embodiments, one or more tracking or counting systems can be implemented upstream in the manufacturing process 510, such as to enable tracking/logistic planning (including separating orders) throughout the manufacturing process 510.

Example Color Marking System

In some embodiments, the present invention contemplates using a color marking system to enable automated efficient control of various manufacturing systems, such as a reel editor. Though the following description focuses on control of a corrugator, some embodiments of the present invention contemplate using the proposed color marking scheme (or aspects thereof) for automated control of any of the contemplated manufacturing systems, such as a reel editor. In some embodiments, other schemes may be employed, such as include computer readable markers and/or non-computer readable markers.

In some embodiments, the color marking scheme may be employed instead of a readable marker. In addition to overcoming some of the prior manual checking shortcomings described above, the contemplated color markings also provide advantages over prior three line black-only cut-to-mark markers. In this regard, some corrugators detect such cut-to-mark markers and immediately initiate a cut. This approach, however, is limited—as all the cut markers look the same and, thus, the reel map has to be monitored closely and continually and manually checked to confirm that the right boxes were being cut/printed.

The present invention contemplates using a similar three line mark, but utilizing different colors to portray an upcoming "change" to the corrugator. In particular, a vision system reads the color of each marker. When a different color is recognized, then the controller knows to "check" the corrugator plan and/or associated reel map to determine how to operate. For example, the reel map may tell the corrugator that a different position of the knife is needed, different slitting is needed, new scoring is needed, etc. In some embodiments, the colors could be used to locate a position on the corrugator plan and/or associated reel map, making identification of where along the reel map the corrugator is easier. Further, such a system is simpler than using a readable marker, as it utilizes the already formed corrugator plan and/or associated reel map. In particular, it may simply trigger an automatic checking of the corrugator plan and/or associated reel map at the appropriate time (such as opposed to having to manually watch and manually check the reel map).

Figure 9:
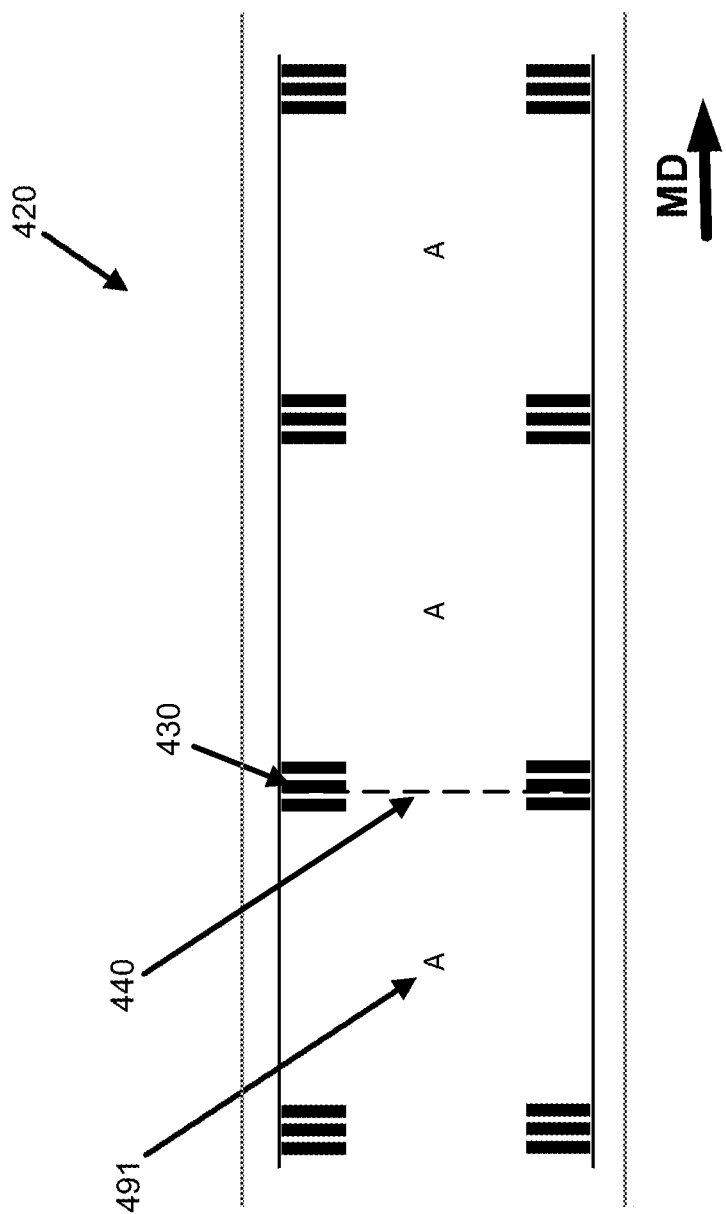
FIG. 9 illustrates a three line mark typically seen in corrugated sheet or box manufacturing of pre-printed liner, in accordance with some embodiments discussed herein.

Along these lines, another benefit of some embodiments of the proposed color marking system is the leveraging of traditional three-line cut-to-mark markers. FIG. 9 shows an example layered corrugate board web 420 that includes traditional three-line cut-to-mark markers 430. When the cut-to-mark markers 430 are detected, the knife will initiate a cut, such as along line 440 to separate the box or sheet structure 491. In the present invention, some embodiments utilize the three-line marker, but use a change in color to add the ability for the controller (e.g., controller 90) to detect a change and, thus, consult the corrugator plan and/or associated reel map for details regarding the anticipated change in operation.

Figure 10:
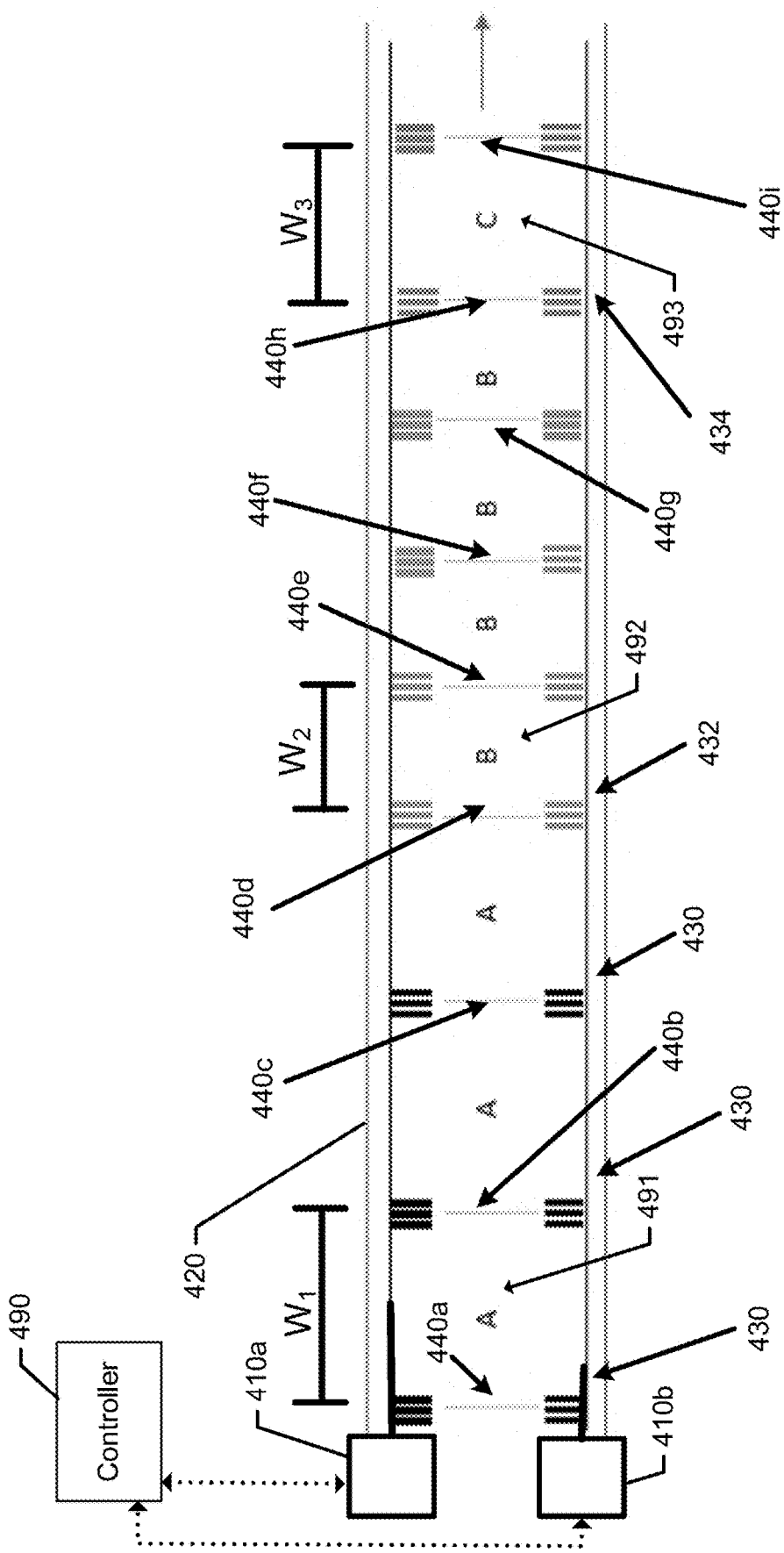
FIG. 10 shows an example portion of a layered corrugated board web, wherein the sheet or box structure areas of the board web each include a color marker, in accordance with example embodiments described herein.

FIG. 10 illustrates an example color marking system. In the depicted embodiment, a layered corrugate board web 420 includes three different sheet or box structures—sheet or box structure A, 491; sheet or box structure B, 492; and sheet or box structure C, 493. As the layered corrugated board web 420 passes along the machine direction (MD), one or more detectors (e.g., detectors 410a, 410b) detect a color marker and/or whether a color change has occurred.

For example, upon detecting color marker 430 (black), the detector 410a may inform the controller 490 which may, in response, cause a cut to occur (e.g., along line 440a). In some embodiments, knowing where along in the reel map the layered corrugate board web is, the controller 490 may know how to operate, such as anticipating an upcoming cut a distance $W_1$ away. In such an example embodiment, the controller 490 may wait to read the next color marker 430 and then initiate a cut in response thereto or the controller 490 may simply monitor the distance and initiate a cut once the distance $W_1$ has passed.

As the layered corrugated board web 420 continues to pass along the machine direction (MD), the corrugator continues to apply cuts at a distance $W_1$ between each cut—causing cuts along 440b, 440c, and 440d. However, when the one or more of the detectors 410a, 410b detect a change in color, such as when detecting color marker 432 (teal), the controller 490 may, in response (e.g., be triggered to), check the reel map and determine how to operate. For example, the controller 490 may know that the new distance between cuts is $W_2$. This would result in cuts along lines 440e, 440f, 440g, and 440h—until another change in color was detected by detecting color marker 434 (magenta). In response, the reel map could be checked and it could be determined that a new distance between cuts is $W_3$.

In the above example, the determination of when a color change occurs triggers automatic checking of the corrugator plan and/or associated reel map, which then informs the controller 490 how to operate the corrugator. In this regard, the checking of the corrugator plan and/or associated reel map is automated (instead of manual) and performed only when needed—e.g., when a change to a new sheet or box structure occurs.

In some embodiments, the color information of the detected color marker is provided by the one or more detectors to the controller 490. In such examples, the controller 490 may be configured to compare the detected color to a prior color to determine if a sufficient degree of color change has occurred in order to trigger looking up the corrugator plan and/or associated reel map. For example, the amount of change in color may be compared to a color change threshold to see if a sufficient amount of color has changed.

In some embodiments, the colors are designed to be formed from digital print standards for 4 color Cyan/Magenta/Yellow/Black (CMYK) and extended gamut Orange/Violet/Green (OVG) plus custom colors as desired and uniquely recognizable by detection technology. Such example embodiments may advantageously limit ink utilization and simplify printability. In some embodiments, RGB print standard approach could be used. In some embodiments, the color of the substrate being used may be accounted for. For example, yellow and orange and/or light to brown colors could be skipped on white top or brown kraft paper products.

Though the depicted embodiment shows the color marker positioned within a sheet or box structure, in some embodiments, the color marker may be positioned in the margins or other waste area, but still associated with the corresponding sheet or box structure.

Figure 11:
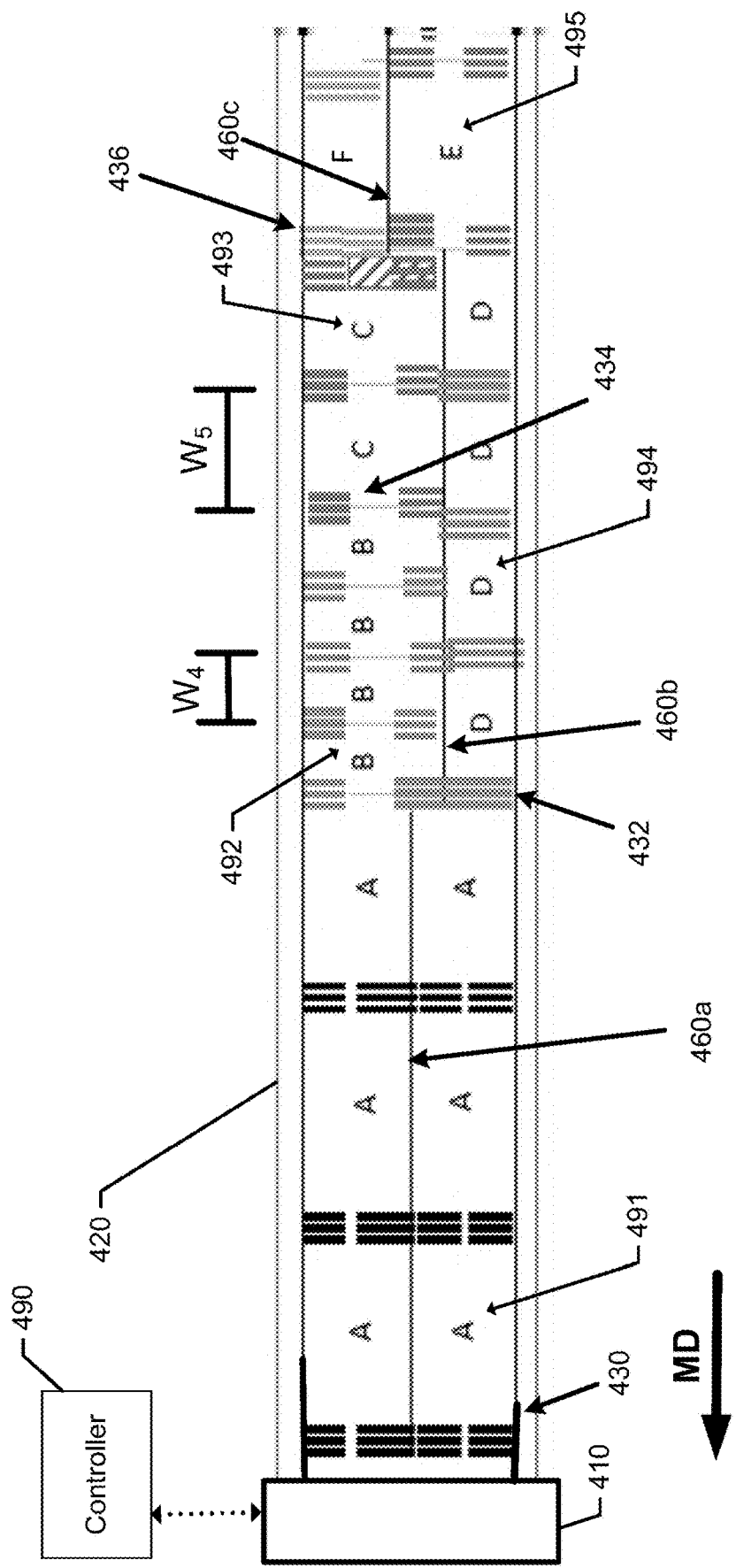
FIG. 11 shows another example portion of a layered corrugated board web, wherein the sheet or box structure areas of the board web each include a color marker, in accordance with example embodiments described herein.

As detailed herein, some embodiments of the present invention contemplate various locations for detectors, such as for detecting the color of color markers. For example, FIG. 9 shows two separate detectors 410*a*, 410*b* positioned near each edge of the layered corrugated board web 420. In other embodiments, one or more detectors may cover any amount up to and including the entire cross direction of the layered corrugated board web. For example, FIG. 11 shows such an example detector 410. With such an example detector 410, the detector 410 is able to detect a color marker that is at any point along the cross direction.

FIG. 11 illustrates an example system that uses detected change in color to determine where to position the slitter to transition between different sheet or box structures in a side-by-side running of sheet or box structures. For example, the controller 490 may be operating with the slitter at a position to initiate a longitudinal (machine) direction cut along line 460*a* while reading color markers 430 (black). However, upon the detector 410 detecting the change in color to color marker 432 (cyan), the controller 490 may check the reel map and update the position of the slitter to initiate a cut along line 460*b*. Likewise, the controller 490 may change the position of the slitter to cut along line 460*c* after checking the reel map in response to detecting a change in color to the color marker 436 (green).

Notably, FIG. 11 also illustrates an example where the slitter position stays the same such that two sections of sheet or box structures are made (e.g., sheet or box structures B and D), but sheet or box structure B transitions to sheet or box structure C on the top section. In this regard, the detector detects a change in color when detecting color marker 434. In response, the reel map is checked and there is no change in operation to either the slitter or the knife for the bottom section (e.g., the bottom section is still sheet or box structure D). However, the knife for the top section changes when it initiates a cut from a distance between cuts of $W_4$ to a distance between cuts of $W_5$—thereby adjusting to sheet or box structure C.

Figure 12:
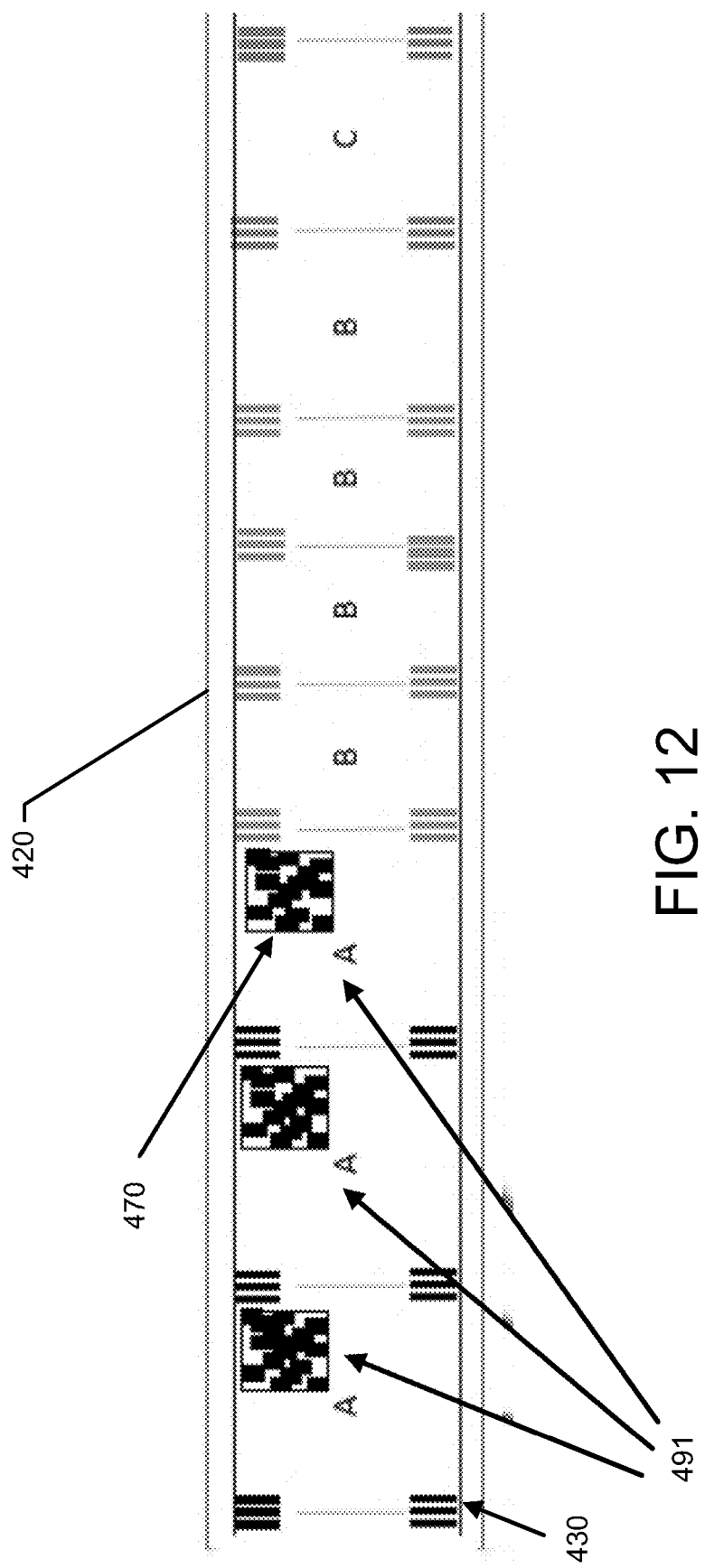
FIG. 12 shows yet another example portion of a layered corrugated board web, wherein the sheet or box structure areas of the board web each include a color marker, and wherein some of the sheet or box structure areas include a readable marker, in accordance with example embodiments described herein.

In some embodiments, readable markers may still be present on, at least, some of the sheet or box structures. Such readable markers (e.g., bar codes, QR codes, etc.) may, in some embodiments, be configured to enable tracking of the orders. Additionally or alternatively, the readable markers may supplement the color markers and enable some control of the corrugator upon being read and/or may be utilized for downstream processes after the corrugator (e.g., for tracking and other logistics). FIG. 12 illustrates an example layered corrugate board web 420 with sheet or box structures A, 491 that have color markers 430 and readable markers 470.

Example Other Product Manufacturing Processes

As noted herein, some embodiments contemplate systems for controlling manufacturing of various products, such as various paper-based products, including corrugated boxes, folded carton, labels, flexible paper, industrial bags, plates, cups, décor, and many others. FIGS. 13-16 illustrate block diagrams of various example other paper-based product manufacturing contemplated by various embodiments described herein. In this regard, some embodiments of the present invention contemplate one or more controllers (e.g., controller 90) that can generate and provide a control plan to various devices/systems for performing efficient manufacturing of such various products.

Figure 13:
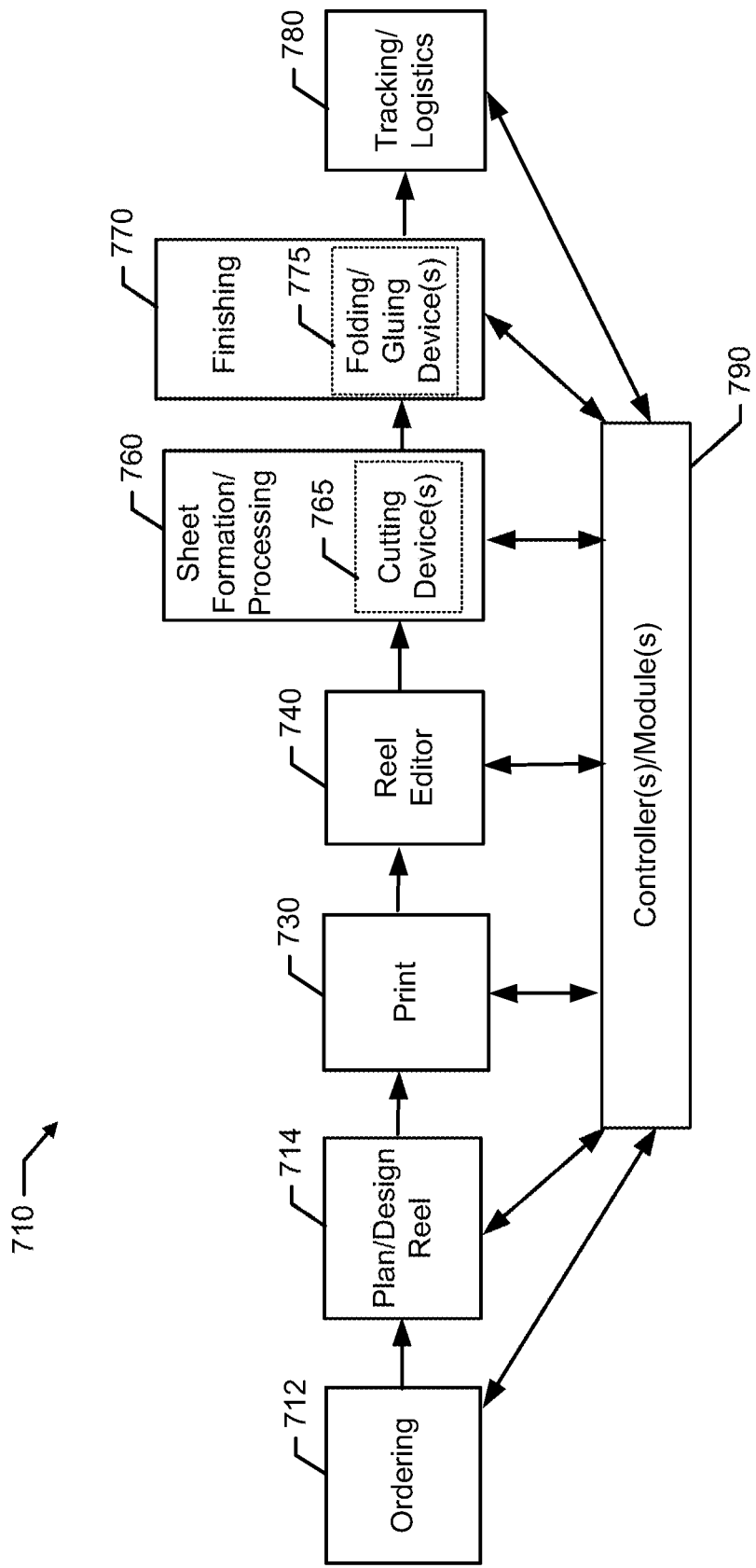
FIG. 13 shows a block diagram of an example folded carton manufacturing process, in accordance with some embodiments discussed herein.

FIG. 13 shows a block diagram of an example folded carton manufacturing process according to various embodiments of the present invention. The manufacturing process 710 includes a number of phases that result in a finished folded carton that is shaped, formed, and printed per the customer's order. The process 710 may include an ordering phase 712, a planning phase 714, a print phase 730, a reel editor phase 740, a sheet formation/processing phase 760, a finishing phase 770, and a tracking/logistics phase 780. Such phases may be similar to the phases described with respect to the manufacturing phase 10 of FIG. 1. In some embodiments, less or more phases or different orders of phases are contemplated. Depending on the desired configuration, one or more controller(s) 790 may be used to control one or more various phases (e.g., various systems/devices therein) of the manufacturing process 710. In some embodiments, one device/system may encompass multiple phases, such as two or more of the printing phase 730, the reel editor phase 740, the sheet formation/processing phase 760, and the finishing phase 770.

In some embodiments, like the manufacturing process 10 described with respect to FIG. 1, the example folded carton manufacturing process 710 may include one or more cutting devices 765 for cutting one or more sheets (or structures) from the roll of web product. Additionally, in some embodiments, a web forming device may form an updated web, such as prior to processing through the cutting device.

In some embodiments, the folded carton manufacturing process 710 may include one or more unique devices, such as a folding/gluing device 775 that may form part of the finishing phase 770 (or the sheet formation/processing phase 760). The folding/gluing device 775, such as using one or more folding arms or other hardware and/or various software, may be configured to perform one or more folds of various sheets to form the desired folded carton. In some embodiments, the folding device 775 may be configured to apply glue separately or in addition to performing the one or more folds.

Figure 14:
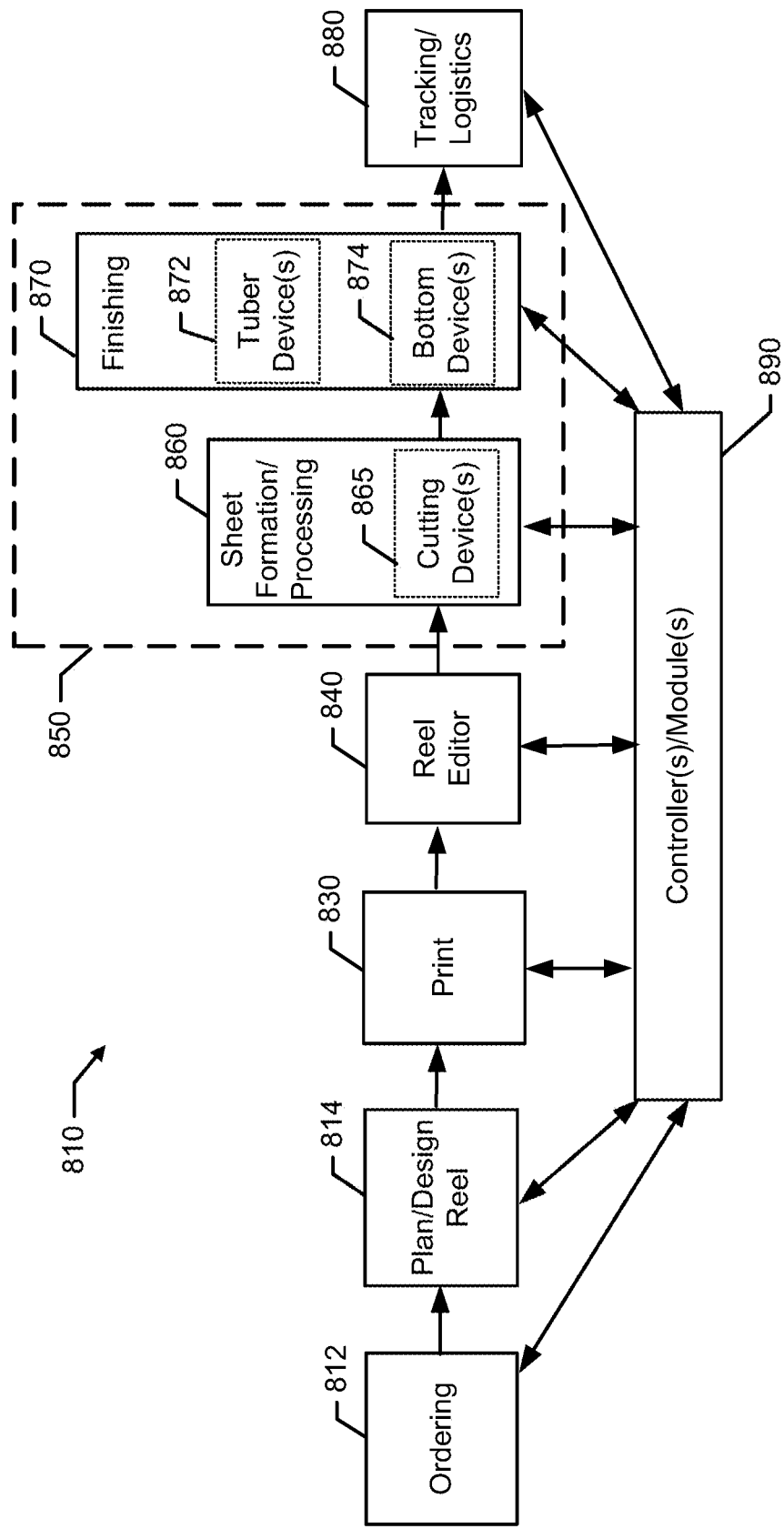
FIG. 14 shows a block diagram of an example industrial bag manufacturing process, in accordance with some embodiments discussed herein.

FIG. 14 shows a block diagram of an example industrial bag manufacturing process. The manufacturing process 810 includes a number of phases that result in a finished industrial bag that is shaped, formed, and printed per the customer's order. The process 810 may include an ordering phase 812, a planning phase 814, a print phase 830, a reel editor phase 840, a sheet formation/processing phase 860, a finishing phase 870, and a tracking/logistics phase 880. Such phases may be similar to the phases described with respect to the manufacturing phase 10 of FIG. 1. In some embodiments, less or more phases or different orders of phases are contemplated. Depending on the desired configuration, one or more controller(s) 890 may be used to control one or more various phases (e.g., various systems/devices therein) of the manufacturing process 810. In some embodiments, one device/system may encompass multiple phases, such as two or more of the printing phase 830, the reel editor phase 840, the sheet formation/processing phase 860, and the finishing phase 870. For example, an industrial bag manufacturing machine 850 may encompass both the sheet formation/processing phase 860 and the finishing phase 870.

In some embodiments, like the manufacturing process 10 described with respect to FIG. 1, the example industrial bag manufacturing process 810 may include one or more cutting devices 865 for cutting one or more sheets (or structures) from the roll of web product. Additionally, in some embodiments, a web forming device may form an updated web, such as prior to processing through the cutting device.

In some embodiments, the industrial bag manufacturing process 810 may include one or more unique devices, such as a tuber device 872 and/or bottom device 874 that may form part of the finishing phase 870 (or the sheet formation/processing phase 860). The tuber device 872, such as using various hardware and/or software, may be configured to form one or more sheets into one or more tubes. The bottom device 874, such as using various hardware and/or software, may be configured to form a bottom on each of the tubes to form the industrial bag.

Figure 15:
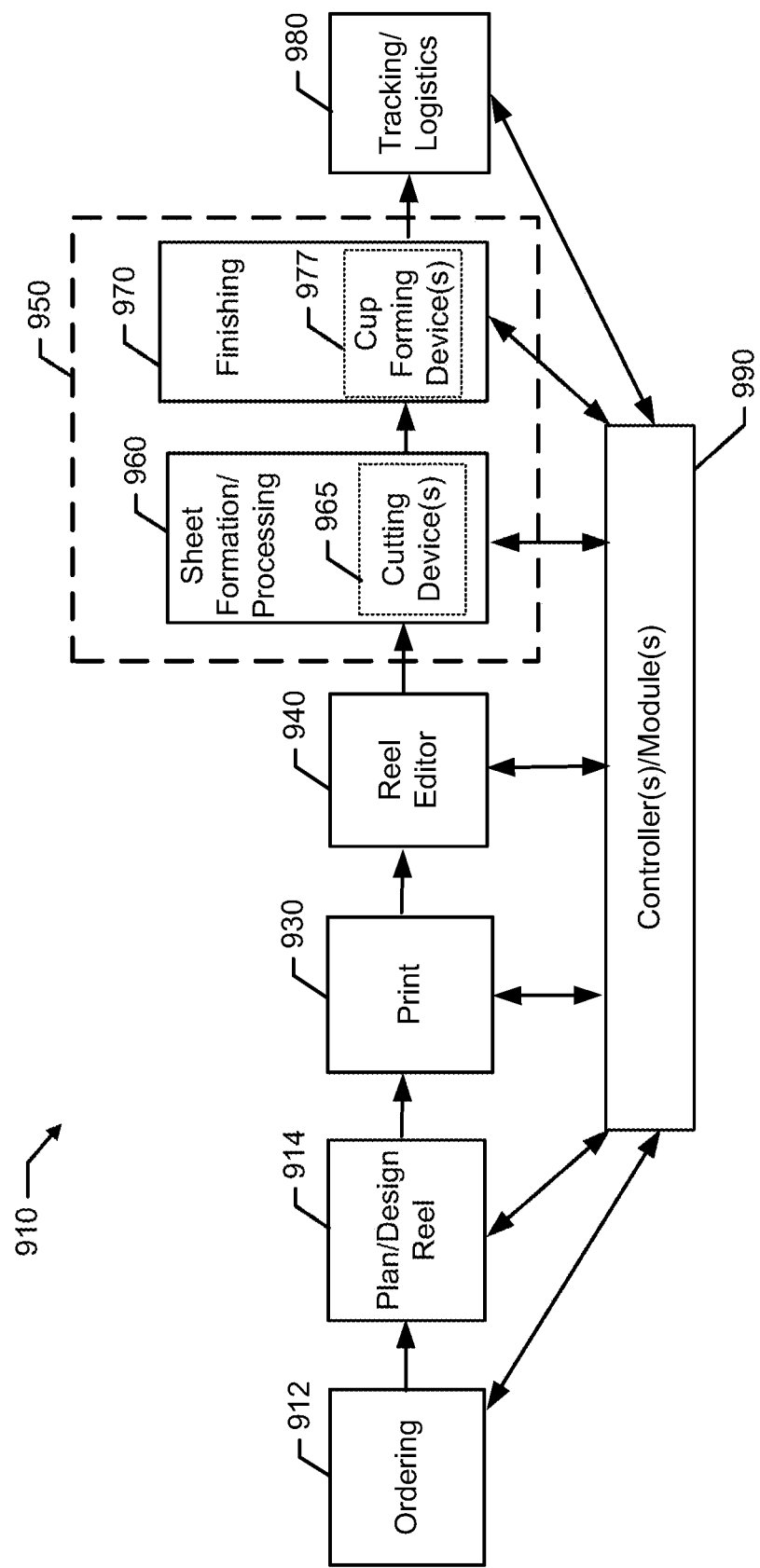
FIG. 15 shows a block diagram of an example cup manufacturing process, in accordance with some embodiments discussed herein.

FIG. 15 shows a block diagram of an example cup manufacturing process. The manufacturing process 910 includes a number of phases that result in a finished cup that is shaped, formed, and printed per the customer's order. The process 910 may include an ordering phase 912, a planning phase 914, a print phase 930, a reel editor phase 940, a sheet formation/processing phase 960, a finishing phase 970, and a tracking/logistics phase 980. Such phases may be similar to the phases described with respect to the manufacturing phase 10 of FIG. 1. In some embodiments, less or more phases or different orders of phases are contemplated. Depending on the desired configuration, one or more controller(s) 990 may be used to control one or more various phases (e.g., various systems/devices therein) of the manufacturing process 910. In some embodiments, one device/system may encompass multiple phases, such as two or more of the printing phase 930, the reel editor phase 940, the sheet formation/processing phase 960, and the finishing phase 970. For example, a cup manufacturing machine 950 may encompass both the sheet formation/processing phase 960 and the finishing phase 970.

In some embodiments, like the manufacturing process 10 described with respect to FIG. 1, the example cup manufacturing process 910 may include one or more cutting devices 965 for cutting one or more sheets (or structures) from the roll of web product. Additionally, in some embodiments, a web forming device may form an updated web, such as prior to processing through the cutting device.

In some embodiments, the cup manufacturing process 910 may include one or more unique devices, such as a cup former 977 that may form part of the finishing phase 970 (or the sheet formation/processing phase 960). The cup former 977, such as using various hardware and/or software, may be configured to form one or more sheets (or structures) into a cup with a desired shape (e.g., the cup former 977 may employ a die-cutter that cuts the sheet into a desired shape and a cup formation device that forms the cylindrical cup shape with a bottom and glues the cup together).

Figure 16:
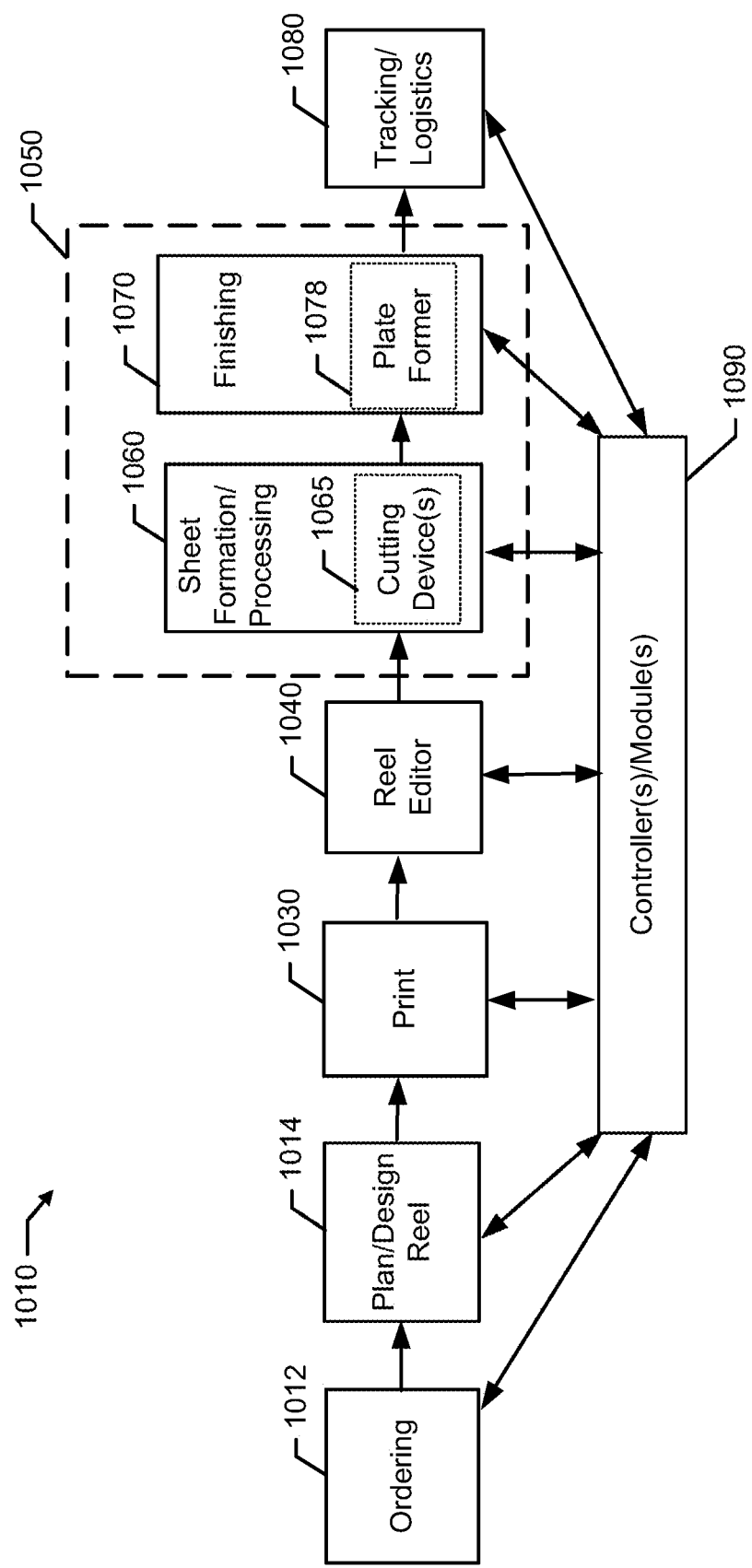
FIG. 16 shows a block diagram of an example paper plate manufacturing process, in accordance with some embodiments discussed herein.

FIG. 16 shows a block diagram of an example paper plate manufacturing process. The manufacturing process 1010 includes a number of phases that result in a finished paper plate that is shaped, formed, and printed per the customer's order. The process 1010 may include an ordering phase 1012, a planning phase 1014, a print phase 1030, a reel editor phase 1040, a sheet formation/processing phase 1060, a finishing phase 1070, and a tracking/logistics phase 1080. Such phases may be similar to the phases described with respect to the manufacturing phase 10 of FIG. 1. In some embodiments, less or more phases or different orders of phases are contemplated. Depending on the desired configuration, one or more controller(s) 1090 may be used to control one or more various phases (e.g., various systems/devices therein) of the manufacturing process 1010. In some embodiments, one device/system may encompass multiple phases, such as two or more of the printing phase 1030, the reel editor phase 1040, the sheet formation/processing phase 1060, and the finishing phase 1070. For example, a plate manufacturing machine 1050 may encompass both the sheet formation/processing phase 1060 and the finishing phase 1070.

In some embodiments, like the manufacturing process 10 described with respect to FIG. 1, the example paper plate manufacturing process 1010 may include one or more cutting devices 1065 for cutting one or more sheets (or structures) from the roll of web product. Additionally, in some embodiments, a web forming device may form an updated web, such as prior to processing through the cutting device.

In some embodiments, the paper plate manufacturing process 1010 may include one or more unique devices, such as a plate former 1078 that may form part of the finishing phase 1070 (or the sheet formation/processing phase 1060). The plate former 1078, such as using various hardware and/or software, may be configured to form one or more sheets (or structures) into a plate with a desired shape (e.g., the plate former 1078 may have a stamping device that stamps the sheet into a desired shape).

Although the above description notes one or more distinctions between the various manufacturing processes 710, 810, 910, 1010 and the manufacturing process 10, other distinctions are contemplated by some embodiments of the present invention. For example, the tracking/logistics phase for each manufacturing process may be different or employ different techniques that allow for efficient manufacturing of the end product. Whether the same or different, various tracking/marking/detecting techniques described herein may be employed with manufacturing of such example products to provide for an efficient manufacturing process.

Example Flowchart(s)

Embodiments of the present invention provide methods, apparatuses and computer program products for controlling and operating a reel editor for manufacturing paper, sheet, or box structures according to various embodiments described herein. Various examples of the operations performed in accordance with embodiments of the present invention will now be provided with reference to FIGS. 17-18.

Figure 17:
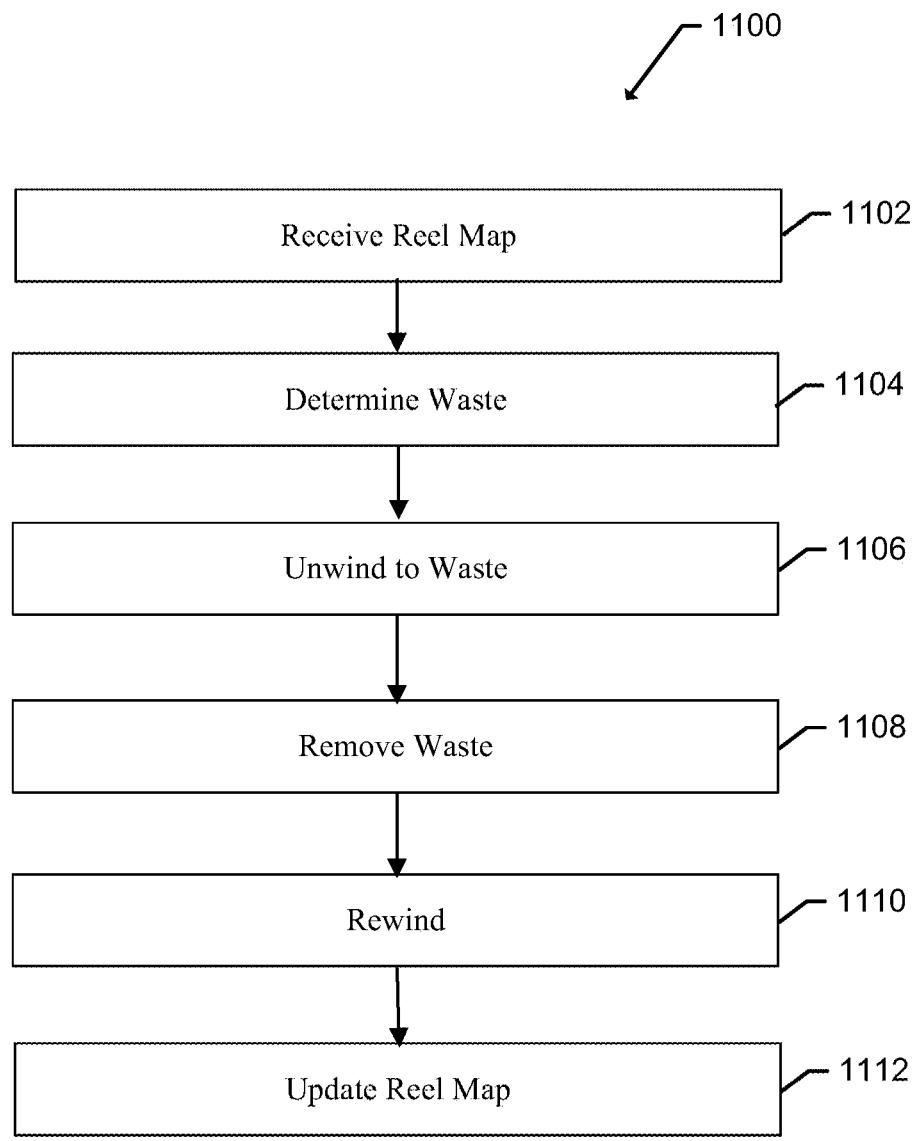
FIG. 17 illustrates a flowchart of an example method for editing a roll of printed web product, in accordance with some embodiments discussed herein.

FIG. 17 illustrates a flowchart according to an example method for editing a roll of printed web product according to an example embodiment. The operations illustrated in and described with respect to FIG. 17 may, for example, be performed by, with the assistance of, and/or under the control of one or more of the controller 90, 392, 490, 590, 790, 890, 990, 1090 components of the phases in the described manufacturing process 10, 510, 710, 810, 910, 1010 and/or modules present in the described platform 100.

The method 1100 may include receiving (or retrieving) a reel map associated with a roll of printed web product at operation 1102. At operation 1104, the method comprises determining one or more location of waste on the roll of printed web product. Then, the method comprises, at operation 1106, unwinding the roll of printed web product to present one or more locations associated with waste at a cutting station. At operation 1108, the method comprises removing the waste and winding the edited roll of printed web product. At operation 1110, the method comprises rewinding the edited roll of printed web product. At operation 1112, the method comprises updating the reel map associated with the roll of printed web product to account for the removed waste.

Figure 18:
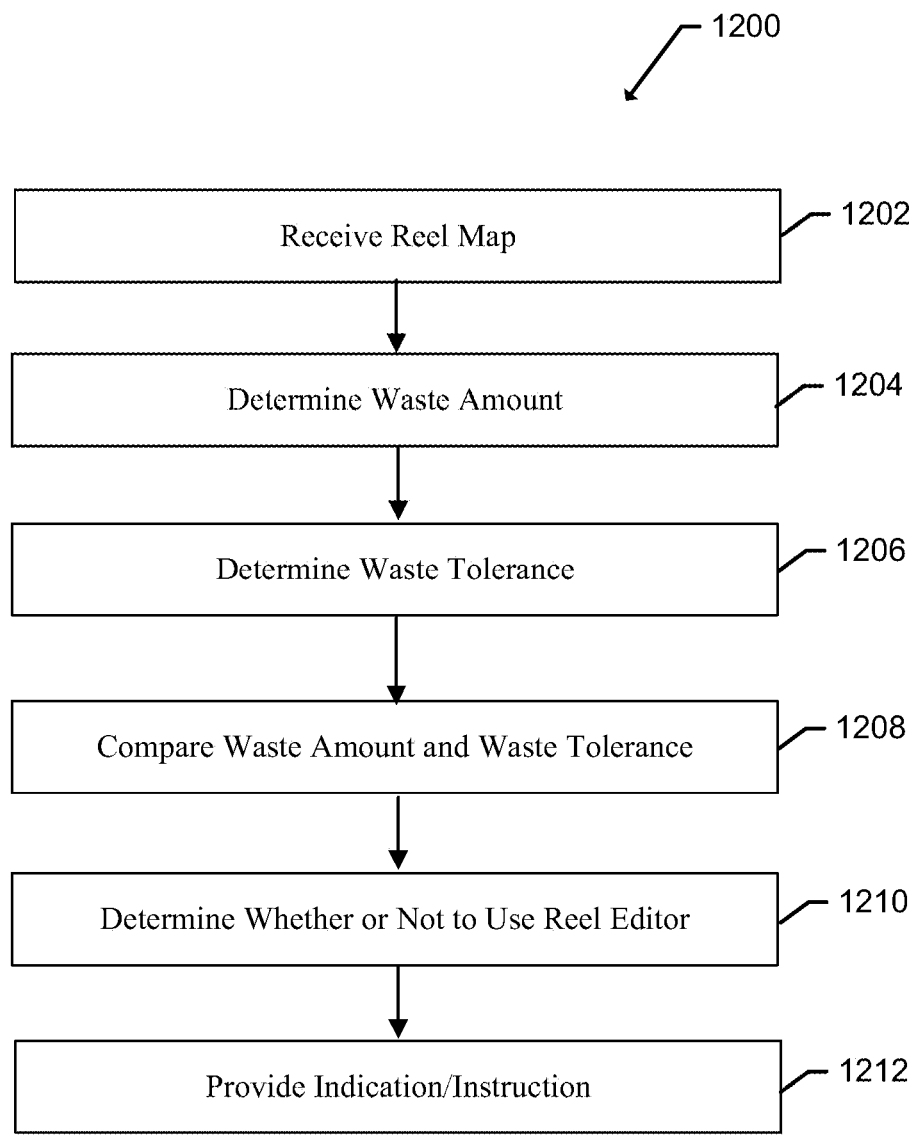
FIG. 18 illustrates a flowchart of an example method for determining whether or not to edit a roll of printed web product, in accordance with some embodiments discussed herein.

FIG. 18 illustrates a flowchart according to another example method for determining whether or not to edit a roll of printed web product according to an example embodiment. The operations illustrated in and described with respect to FIG. 18 may, for example, be performed by, with the assistance of, and/or under the control of one or more of the controller 90, 392, 490, 590, 790, 890, 990, 1090 components of the phases in the described manufacturing process 10, 510, 710, 810, 910, 1010 and/or modules present in the described platform 100.

The method 1200 may include receiving or retrieving a reel map associated with a roll of printed web product at operation 1202. At operation 1204, the method comprises determining an amount of waste on the roll of printed web product. Then, at operation 1206, the method comprises determining a waste tolerance for the roll of printed web product. At operation 1208, the method comprises comparing the determined waste amount with the determined waste tolerance threshold and, then, at operation 1210, determining whether or not to use the reel editor to edit the roll of printed web product based on the comparison. Further, at operation 1212, an indication or instruction is provided accordingly.

FIGS. 17-18 illustrate flowcharts of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the controller 90. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A method for determining whether or not to edit waste from a roll of printed web product using a reel editor, the method comprising:
   receiving, from a vision system module of a manufacturing process, a control plan associated with the roll of printed web product, wherein each roll of printed web product is associated with a unique control plan, wherein the control plan comprises roll data that includes order data and waste data, wherein the waste data indicates one or more waste sections on the roll of printed web product, wherein each of the one or more waste sections corresponds to at least one of waste on the roll of printed web product or unsatisfactory images that are printed on the roll of printed web product, wherein the order data corresponds to one or more printed orders on the roll of printed web product and includes at least one of cost associated with processing material for the order, customer data associated with the roll of printed web product, desired quality data associated with the roll of printed web product, or pricing data associated with the roll of printed web product;
   determining, by a processor, an amount of waste on the roll of printed web product based on the waste data of the control plan;
   determining, based on the order data of the control plan, a waste tolerance threshold for the roll of printed web product;
   determining if the determined amount of waste satisfies the determined waste tolerance threshold for the roll of printed web product; and
   in an instance in which the determined amount of waste satisfies the determined waste tolerance threshold for the roll of printed web product, providing an instruction to not edit the roll of printed web product at the reel editor such that no waste is removed via the reel editor.

2. The method of claim 1 further comprising, in an instance in which the determined amount of waste does not satisfy the determined waste tolerance threshold for the roll of printed web product, providing an instruction to edit the roll of printed web product at the reel editor such that at least some of the waste is removed via the reel editor.

3. The method of claim 1, wherein providing the instruction to not edit the roll of printed web product comprises causing a notification to not edit the roll of printed web product to be at least one of sent to or presented on a display for an operator.

4. The method of claim 1, wherein providing the instruction to not edit the roll of printed web product comprises sending the control plan directly to a corrugator control module such that the control plan is not transmitted to a reel editor.

5. The method of claim 1, wherein the roll of printed web product comprises a plurality of order sections, wherein each order section includes at least one structure outline and at least one image printed within each structure outline, wherein:
- determining an amount of waste comprises determining an amount of waste for each order section,
- determining a waste tolerance threshold comprises determining a waste tolerance threshold for each order section, and
- determining if the determined amount of waste satisfies the determined waste tolerance threshold comprises determining if the determined amount of waste satisfies the determined waste tolerance threshold for each order section.

6. The method of claim 5, wherein providing the instruction to not edit the roll of printed web product at the reel editor comprises providing the instruction in an instance in which the determined amount of waste satisfies the determined waste tolerance threshold for all of the order section on the roll of printed web product.

7. The method of claim 5, wherein providing the instruction to not edit the roll of printed web product at the reel editor comprises providing the instruction in an instance in which the determined amount of waste satisfies the determined waste tolerance threshold for a predetermined number of order sections on the roll of printed web product.

8. The method of claim 1, wherein determining the waste tolerance threshold comprises determining the waste tolerance threshold based on a desired quality of one or more orders on the roll of printed web product.

9. The method of claim 1, wherein determining the waste tolerance threshold comprises determining the waste tolerance threshold based on an estimated cost of removing waste from the roll of printed web product using the reel editor.

10. The method of claim 1, wherein determining the waste tolerance threshold comprises determining the waste tolerance threshold based on a pricing of one or more orders on the roll of printed web product.

11. The method of claim 1 further comprising providing at least one of waste data or an indication of a result of determining if the determined amount of waste satisfies the determined waste tolerance threshold for the roll of printed web product to a customer insight module that is configured to generate one or more reports using the waste data or the result.

12. A system for determining whether or not to edit waste from a roll of printed web product using a reel editor, the system comprising:
- a controller; and
- a memory including computer program product stored thereon, wherein the computer program product is configured, when executed by the controller, to:
  - receive, from a vision system module of a manufacturing process, a control plan associated with the roll of printed web product, wherein each roll of printed web product is associated with a unique control plan, wherein the control plan comprises roll data that includes order data and waste data, wherein the waste data indicates one or more waste sections on the roll of printed web product, wherein each of the one or more waste sections corresponds to at least one of waste on the roll of printed web product or unsatisfactory images that are printed on the roll of printed web product, wherein the order data corresponds to one or more printed orders on the roll of printed web product and includes at least one of cost associated with processing material for the order, customer data associated with the roll of printed web product, desired quality data associated with the roll of printed web product, or pricing data associated with the roll of printed web product;
  - determine, by a processor, an amount of waste on the roll of printed web product based on the waste data of the control plan;
  - determine, based on the order data of the control plan, a waste tolerance threshold for the roll of printed web product;
  - determine if the determined amount of waste satisfies the determined waste tolerance threshold for the roll of printed web product; and
  - in an instance in which the determined amount of waste satisfies the determined waste tolerance threshold for the roll of printed web product, provide an instruction to not edit the roll of printed web product at the reel editor such that no waste is removed via the reel editor.

13. The system of claim 12, wherein the computer program product is further configured, when executed by the controller, to, in an instance in which the determined amount of waste does not satisfy the determined waste tolerance threshold for the roll of printed web product, provide an instruction to edit the roll of printed web product at the reel editor such that at least some of the waste is removed via the reel editor.

14. The system of claim 12, wherein the computer program product is further configured, when executed by the controller, to provide the instruction to not edit the roll of printed web product by causing a notification to not edit the roll of printed web product to be at least one of sent to or presented on a display for an operator.

15. The system of claim 12, wherein the computer program product is further configured, when executed by the controller, to provide the instruction to not edit the roll of printed web product by sending the control plan directly to a corrugator control module such that the control plan is not transmitted to a reel editor.

16. The system of claim 12, wherein the roll of printed web product comprises a plurality of order sections, wherein each order section includes at least one structure outline and at least one image printed within each structure outline, wherein the computer program product is further configured, when executed by the controller, to:
- determine an amount of waste comprises determining an amount of waste for each order section,
- determine a waste tolerance threshold comprises determining a waste tolerance threshold for each order section, and
- determine if the determined amount of waste satisfies the determined waste tolerance threshold comprises determining if the determined amount of waste satisfies the determined waste tolerance threshold for each order section.

17. The system of claim 16, wherein the computer program product is further configured, when executed by the controller, to provide the instruction to not edit the roll of printed web product at the reel editor by providing the instruction in an instance in which the determined amount of waste satisfies the determined waste tolerance threshold for all of the order section on the roll of printed web product.

18. The system of claim 16, wherein the computer program product is further configured, when executed by the controller, to provide the instruction to not edit the roll of printed web product at the reel editor by providing the instruction in an instance in which the determined amount of waste satisfies the determined waste tolerance threshold for a predetermined number of order sections on the roll of printed web product.

19. The system of claim 12, wherein the computer program product is further configured, when executed by the controller, to determine the waste tolerance threshold by determining the waste tolerance threshold based on a desired quality of one or more orders on the roll of printed web product.

20. A system for determining whether or not to edit waste from a roll of printed web product using a reel editor, the system comprising:
- a first winding station comprising a winding device that is configured to wind and unwind the roll of printed web product, wherein the first winding station is configured to receive the roll of printed web product;
- a cutting station configured to enable one or more portions of the roll of printed web product to be removed;
- a second winding station that is configured to receive a tail end of the roll of printed web product and enable winding and unwinding of the roll of printed web product;
- a reel editor module configured to:
  - receive, from a vision system module of a manufacturing process, a control plan associated with the roll of printed web product, wherein each roll of printed web product is associated with a unique control plan, wherein the control plan comprises roll data that includes order data and waste data, wherein the waste data indicates one or more waste sections on the roll of printed web product, wherein each of the one or more waste sections corresponds to at least one of waste on the roll of printed web product or unsatisfactory images that are printed on the roll of printed web product, wherein the order data corresponds to one or more printed orders on the roll of printed web product and includes at least one of cost associated with processing material for the order, customer data associated with the roll of printed web product, desired quality data associated with the roll of printed web product, or pricing data associated with the roll of printed web product;
  - determine, by a processor, an amount of waste on the roll of printed web product based on the waste data of the control plan;
  - determine, based on the order data of the control plan, a waste tolerance threshold for the roll of printed web product;
  - determine if the determined amount of waste satisfies the determined waste tolerance threshold for the roll of printed web product; and
  - in an instance in which the determined amount of waste satisfies the determined waste tolerance threshold for the roll of printed web product, provide an instruction to not edit the roll of printed web product at the reel editor such that no waste is removed via the reel editor.

\* \* \* \* \*